United States Patent
Meager

(10) Patent No.: US 12,441,135 B2
(45) Date of Patent: Oct. 14, 2025

(54) QUICK COUPLING FOR WHEEL-TO-VEHICLE ATTACHMENT

(71) Applicant: AZAK INC., Driggs, ID (US)

(72) Inventor: Benjamin Meager, Felt, ID (US)

(73) Assignee: AZAK INC., Driggs, ID (US)

( * ) Notice: Subject to any disclaimer, the term of this patent is extended or adjusted under 35 U.S.C. 154(b) by 771 days.

(21) Appl. No.: 17/565,153

(22) Filed: Dec. 29, 2021

(65) Prior Publication Data

US 2022/0203758 A1 Jun. 30, 2022

Related U.S. Application Data

(60) Provisional application No. 63/163,178, filed on Mar. 19, 2021, provisional application No. 63/131,418, filed on Dec. 29, 2020.

(51) Int. Cl.
*B60B 3/14* (2006.01)
*B60K 7/00* (2006.01)

(52) U.S. Cl.
CPC .............. *B60B 3/14* (2013.01); *B60K 7/0007* (2013.01); *B60B 2900/541* (2013.01)

(58) Field of Classification Search
CPC .... B60B 3/14; B60B 2900/541; B60K 7/0007
See application file for complete search history.

(56) References Cited

U.S. PATENT DOCUMENTS

| | | | |
|---|---|---|---|
| 1,357,571 A | 11/1920 | Knepper | |
| 1,905,345 A | 4/1933 | Dandini | |
| 1,915,886 A | 6/1933 | Gutierrez | |
| 2,977,714 A | 4/1961 | Gibson | |
| 3,016,967 A | 1/1962 | Rehfeld | |
| 3,400,286 A | 9/1968 | Anastasio | |
| 3,661,212 A | 5/1972 | Johnson | |
| 3,667,156 A | 6/1972 | Tomiyama et al. | |
| 3,905,323 A | 9/1975 | Kacere | |
| 3,987,915 A | 10/1976 | Conner | |
| 4,096,919 A | 6/1978 | Thompson | |
| 4,102,542 A | 7/1978 | Pirre, Jr. et al. | |
| 4,501,569 A | 2/1985 | Clark, Jr. et al. | |
| 4,726,800 A | 2/1988 | Kobayashi | |
| 5,163,494 A | 11/1992 | MacNeil et al. | |

(Continued)

FOREIGN PATENT DOCUMENTS

| | | |
|---|---|---|
| CN | 203496596 | 3/2014 |
| DE | 19634195 | 1/1998 |

(Continued)

OTHER PUBLICATIONS

Invitation to Pay Additional Fees for International (PCT) Patent Application No. PT/US21/65488, dated Mar. 23, 2022 2 pages.

(Continued)

*Primary Examiner* — Valentin Neacsu
*Assistant Examiner* — Michael R Stabley
(74) *Attorney, Agent, or Firm* — Sheridan Ross P.C.

(57) ABSTRACT

Mechanisms are disclosed for releasably attaching a wheel to a vehicle in a position where the wheel supports a weight of the vehicle. An illustrative quick connect system is described to include a wheel, a vehicle frame, and a coupling system that releasably attaches the wheel to the vehicle frame. The coupling system, when in a coupled state, may substantially prevent or oppose rotation between a wheel core and the vehicle frame.

26 Claims, 28 Drawing Sheets

(56) References Cited

U.S. PATENT DOCUMENTS

| | | |
|---|---|---|
| 5,427,193 A | 6/1995 | Avakian |
| 5,755,304 A | 5/1998 | Trigg et al. |
| 5,878,829 A | 3/1999 | Kanno et al. |
| 6,302,494 B1 | 10/2001 | DiMarco et al. |
| 6,328,123 B1 | 12/2001 | Niemann et al. |
| 6,585,490 B1 | 7/2003 | Gabrys et al. |
| 7,011,171 B1 | 3/2006 | Poulter |
| 7,198,280 B2 | 4/2007 | Hara |
| 7,494,398 B2 | 2/2009 | Laurienzo |
| 7,659,680 B1 | 2/2010 | McVickers |
| 8,701,801 B2 | 4/2014 | Itou et al. |
| 8,807,254 B2 | 8/2014 | Manus |
| 9,457,647 B2 | 10/2016 | Meager |
| 9,616,318 B2 | 4/2017 | Rogers |
| 9,660,500 B2 | 5/2017 | Huang |
| 9,919,200 B2 | 3/2018 | Mo |
| 9,950,243 B2 | 4/2018 | Evans |
| 9,950,703 B2 | 4/2018 | Lee et al. |
| 10,065,693 B2 | 9/2018 | Meager |
| 10,179,508 B2 | 1/2019 | Meager |
| 10,543,874 B2 | 1/2020 | Meager |
| 10,807,659 B2 | 10/2020 | Pikulski |
| 10,814,211 B2 | 10/2020 | Pikulski |
| 11,040,747 B2 | 6/2021 | Meager |
| 11,583,754 B2 | 2/2023 | Pikulski |
| 11,648,458 B2 | 5/2023 | Rogers |
| 11,975,794 B2 | 5/2024 | Huang |
| 2002/0011368 A1 | 1/2002 | Van Den Berg |
| 2002/0170685 A1 | 11/2002 | Weik, III et al. |
| 2003/0010551 A1 | 1/2003 | Shirazawa |
| 2003/0213630 A1 | 11/2003 | Pyntikov et al. |
| 2004/0092206 A1 | 5/2004 | Lynders et al. |
| 2004/0210356 A1 | 10/2004 | Wilton et al. |
| 2005/0007553 A1 | 1/2005 | Romanoff et al. |
| 2005/0023052 A1 | 2/2005 | Beck et al. |
| 2005/0067207 A1 | 3/2005 | Radtke et al. |
| 2007/0194640 A1 | 8/2007 | Saur et al. |
| 2007/0199748 A1 | 8/2007 | Ross, VII et al. |
| 2007/0256747 A1 | 11/2007 | Morris |
| 2009/0032321 A1 | 2/2009 | Marsh et al. |
| 2010/0139995 A1 | 6/2010 | Rudakevych |
| 2010/0163323 A1 | 7/2010 | Pickholz |
| 2011/0048830 A1 | 3/2011 | Radtke et al. |
| 2011/0106339 A1 | 5/2011 | Phillips et al. |
| 2011/0251935 A1 | 10/2011 | German et al. |
| 2012/0068664 A1 | 3/2012 | Franzen et al. |
| 2012/0302390 A1 | 11/2012 | Lemire-Elmore et al. |
| 2013/0049498 A1 | 2/2013 | Boughtwood |
| 2013/0153311 A1 | 6/2013 | Huntzinger |
| 2014/0341329 A1 | 11/2014 | Goder et al. |
| 2017/0008580 A1 | 1/2017 | Meager |
| 2017/0025922 A1 | 1/2017 | Jian et al. |
| 2017/0259675 A1 | 9/2017 | Gaffoglio et al. |
| 2017/0274886 A1 | 9/2017 | Kreh et al. |
| 2018/0013338 A1 | 1/2018 | Gassman |
| 2018/0022208 A1 | 1/2018 | Calleija et al. |
| 2018/0297654 A1 | 10/2018 | Meager |
| 2019/0173399 A1 | 6/2019 | Lin et al. |
| 2019/0225268 A1 | 7/2019 | Lavoie et al. |
| 2019/0233035 A1 | 8/2019 | Meager |
| 2019/0255701 A1 | 8/2019 | Blankespoor et al. |
| 2020/0001698 A1 | 1/2020 | Jang et al. |
| 2020/0108659 A1 | 4/2020 | Downey et al. |
| 2020/0177054 A1 | 6/2020 | Van Seventer et al. |
| 2021/0023934 A1 | 1/2021 | Gillett |
| 2021/0197903 A1 | 7/2021 | Meager |
| 2021/0276644 A1 | 9/2021 | Meager |
| 2022/0069667 A1 | 3/2022 | Liao |
| 2022/0258532 A1 | 8/2022 | Meager |
| 2023/0046120 A1 | 2/2023 | Meager |
| 2023/0091087 A1 | 3/2023 | Park |
| 2023/0331295 A1 | 10/2023 | Meager |
| 2024/0017606 A1 | 1/2024 | Park |
| 2024/0051640 A1 | 2/2024 | Chen |
| 2024/0092159 A1 | 3/2024 | Cao |
| 2024/0227537 A1 | 7/2024 | Tsunogawa |

FOREIGN PATENT DOCUMENTS

| | | |
|---|---|---|
| DE | 102019202849 | 9/2020 |
| DE | 102020207312 | 12/2021 |
| KR | 10-1004957 | 12/2010 |
| WO | WO 98/19875 | 5/1998 |
| WO | WO 01/28796 | 4/2001 |
| WO | WO 2010/077300 | 7/2010 |
| WO | WO 2016/119022 | 8/2016 |

OTHER PUBLICATIONS

International Search Report and Written Opinion for International (PCT) Patent Application No. PCT/US21/65488, dated May 23, 2022 19 pages.

"Servomotor," Wikipedia, last modified Dec. 2015, 5 pages [retrieved Jan. 21, 2016 from: en.wikipedia.org/wiki/Servomotor.

International Preliminary Report on Patentability for International (PCT) Patent Application No. PCT/US2021/065488, dated Jul. 13, 2023 11 pages.

QUICK COUPLING FOR WHEEL-TO-VEHICLE ATTACHMENT

CROSS-REFERENCE TO RELATED APPLICATION

The present application claims the benefit of U.S. Provisional Patent Application No. 63/131,418, filed on Dec. 29, 2020, and U.S. Provisional Patent Application No. 63/163,178, filed on Mar. 19, 2021, both of which are incorporated herein by reference in their entirety.

FIELD

The present disclosure relates generally to the field of vehicles. More specifically, it relates to connection mechanisms used between a wheel and a vehicle frame.

BACKGROUND

Traditional vehicles employ a centralized motor (e.g., combustion, electric, hybrid, etc.) and translate power generated at the centralized motor to vehicle wheels through a drive train. The drive train traditionally includes one or more rotational elements that transfer rotational motion from the centralized motor to rotational motion of the vehicle wheels. The complexities of many drive trains prohibit certain connections between the vehicle wheels and vehicle frame.

SUMMARY

Embodiments of vehicles and coupling systems for use in coupling a vehicle frame to one or more wheels aim to address the shortcomings of traditional vehicle-to-wheel couplings. For instance, embodiments of the present disclosure contemplate an improved coupling system that includes a coupling and coupling receiver. The coupling and coupling receiver are configured to easily interface with one another, to substantially prevent rotation of a wheel core relative to the vehicle frame, and to easily engage/disengage from a coupled state. As will be described herein, one of a coupling and coupling receiver may be mounted to a wheel whereas the other of the coupling and coupling receiver may be mounted to the vehicle frame. The coupling and coupling receiver may engage one another through a translational motion (e.g., vertical motion of the vehicle frame relative to the wheel, horizontal motion of the vehicle frame relative to the wheel, etc.). Once engaged, the coupling and coupling receiver may be locked together by actuation of an actuator, which moves a lock into or out of a locking position.

A coupling system as described herein may enable an efficient exchange of one wheel for another wheel. Said another way, a vehicle frame may have one or more wheels changed relatively easily and quickly when the vehicle frame and wheel are equipped with a coupling system as depicted and described herein.

In accordance with at least one embodiment, a vehicle is provided that generally includes: a wheel configured to rotate around a wheel core, wherein the wheel core comprises a motor that imparts a rotational force on the wheel causing the wheel to rotate around the wheel core; and a coupling system that couples the wheel core to a vehicle frame, wherein the coupling system releasably attaches the wheel core to the vehicle frame such that in a coupled state the coupling system substantially prevents rotation of the wheel core relative to the vehicle frame.

In some embodiments, the coupling system includes an electrical interconnect that provides an electrical pathway between electrical components provided in the wheel core and electrical components supported by the vehicle frame. The coupling system may also include a plurality of electrical pins that carry an electrical signal between the electrical components provided in the wheel core and the electrical components supported by the vehicle frame. As an example, the electrical components provided in the wheel core include the motor that imparts the rotational force on the wheel. As another example, the electrical components provided in the wheel core further include a power supply for the motor. As another example, the motor and the electrical components provided in the wheel core are positioned below an axis of rotation of the wheel. In some embodiments, the motor is positioned below an axis of rotation of the wheel.

Alternatively or additionally, the coupling system includes an actuator that engages and disengages a mechanical lock that, when engaged, secures a coupling receiver to a coupling. The coupling system itself may include a coupling and a coupling receiver that accepts and secures the coupling in the coupled state. As an example, the coupling may include a mating feature that mechanically locks the coupling to the coupling receiver in the coupled state. In one possible configuration, the coupling is mounted to the wheel core and the coupling receiver is mounted to the vehicle frame. In one possible configuration, the coupling is mounted to the vehicle frame and the coupling receiver is mounted to the wheel core. In at least some embodiments, the coupling includes a frame-side face, a wheel-side face, a bottom end, a top end, and at least two side edges that extend from the frame-side face to the wheel-side face. As an example, the coupling receiver may include a receiver body and a receiver slot that accepts the coupling. The receiver slot may include an opening on one end that accepts the bottom end of the coupling. Illustratively, the coupling is moved into and out of the receiver slot with a vertical translation of the vehicle frame relative to the wheel.

According to still another embodiment of the present disclosure, a coupling system is provided that includes: a coupling comprising a frame-side face, a wheel-side face, a bottom end, a top end, and at least two side edges that extend from the frame-side face to the wheel-side face; and a coupling receiver, where the coupling receiver comprises a receiver body and a receiver slot that accepts the coupling, and where the receiver slot comprises an opening on one end that accepts the bottom end of the coupling.

In some embodiments, a length of the frame-side face is greater than a width of the frame-side face, a thickness of the coupling corresponds to a distance between the frame-side face and the wheel-side face, and the length of the frame-side face is greater than the thickness of the coupling. As an example, the coupling is mounted to one of a vehicle frame and a wheel core, where the coupling receiver is mounted to the other of the vehicle frame and the wheel core, and where the coupling is moved into and out of the receiver slot with a vertical translation of the vehicle frame relative to the wheel core. In some embodiments, the coupling receiver and coupling, when in a coupled state, substantially prevent rotation of the vehicle frame relative to the wheel core.

According to still another embodiment of the present disclosure, a wheel is provided that includes: a wheel core including a motor that imparts a rotational force on the wheel causing the wheel to rotate around the wheel core; and a coupling receiver mounted to the wheel core and configured to receive a coupling provided on a vehicle frame, where the coupling receiver and coupling, when in a coupled state, substantially prevent rotation of the wheel core relative to the vehicle frame.

According to still another embodiment of the present disclosure, a wheel is provided that includes: a wheel core including a motor that imparts a rotational force on the wheel causing the wheel to rotate around the wheel core; and a coupling mounted to the wheel core and configured to mate with a coupling receiver provided on a vehicle frame, where the coupling receiver and coupling, when in a coupled state, substantially prevent rotation of the wheel core relative to the vehicle frame.

BRIEF DESCRIPTION OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. Various changes may be made in the function and arrangement of elements without departing from the spirit and scope of the appended claims.

Various examples are provided throughout the following disclosure. The disclosure of examples is in all cases intended to be non-limiting, including specifically when examples are identified with the terms or phrases identifying what follows to be an example, including the terms of phrases "for example," "as one example," "such as," "by way of example," and "e.g." In other words, the disclosure of one or more examples is not intended to limit the present disclosure to embodiments conforming to the disclosed example(s).

Embodiments of vehicles disclosed herein may include any number of features. While various examples of vehicles will be described with particular features, it should be appreciated that the features depicted and described in connection with a particular vehicle may be used in another vehicle without departing from the scope of the present disclosure. Moreover, embodiments of a wheel or wheel core described in connection with a particular vehicle configuration may be used in any other vehicle configuration without departing from the scope of the present disclosure. Further still, embodiments of the present disclosure contemplate that vehicle wheels or wheel cores may be easily replaced by other wheels or wheel cores. Thus, embodiments of the present disclosure contemplate that wheels of one type or wheel cores of one type may be used to replace wheels of another type or wheel cores of another type.

Figure 1A:
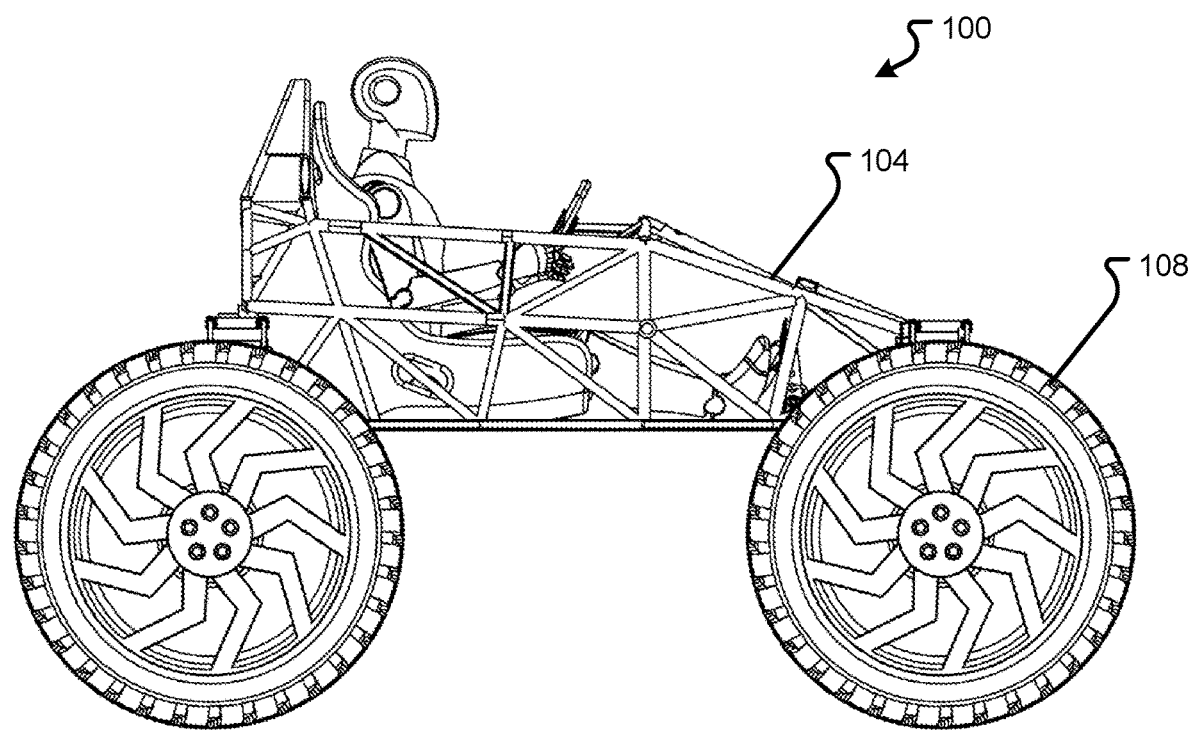
FIG. 1A is side view of a vehicle according to embodiments of the present disclosure.
Figure 1B:
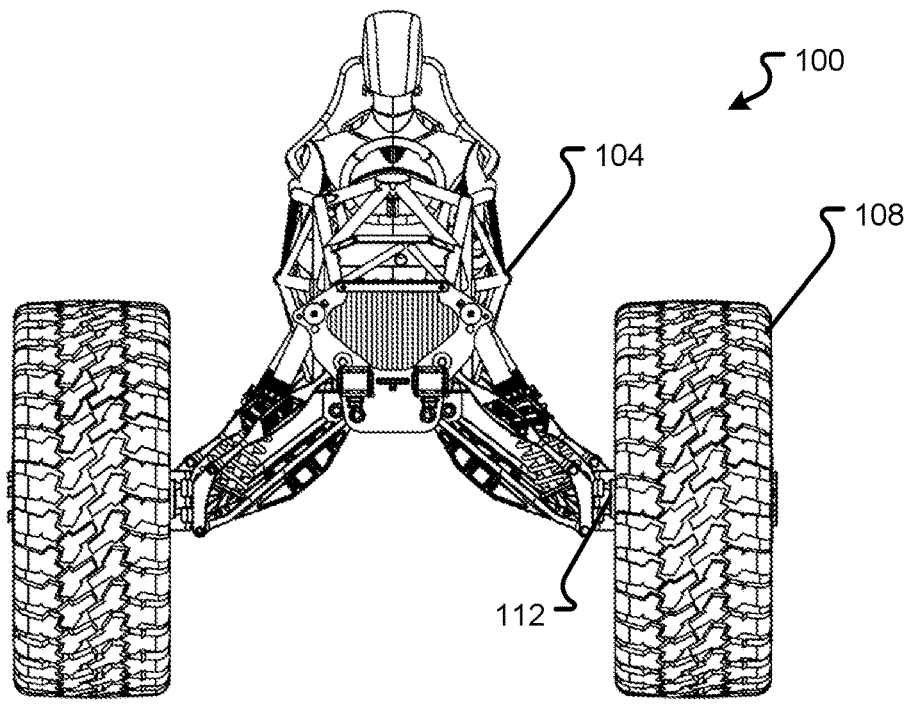
FIG. 1B is a front view of the vehicle in FIG. 1A.

Referring now to FIGS. 1A and 1B, a first example of a vehicle 100 is shown in accordance with at least some embodiments of the present disclosure. The vehicle 100 includes a frame 104 and a plurality of wheels 108. Each of the wheels 108 may be coupled to (e.g., releasably secured to) to a portion of the frame 104 using a coupling system. The coupling system used to couple a wheel 108 to the frame 108 may include a coupling receiver 112 and a coupling.

Figure 2:
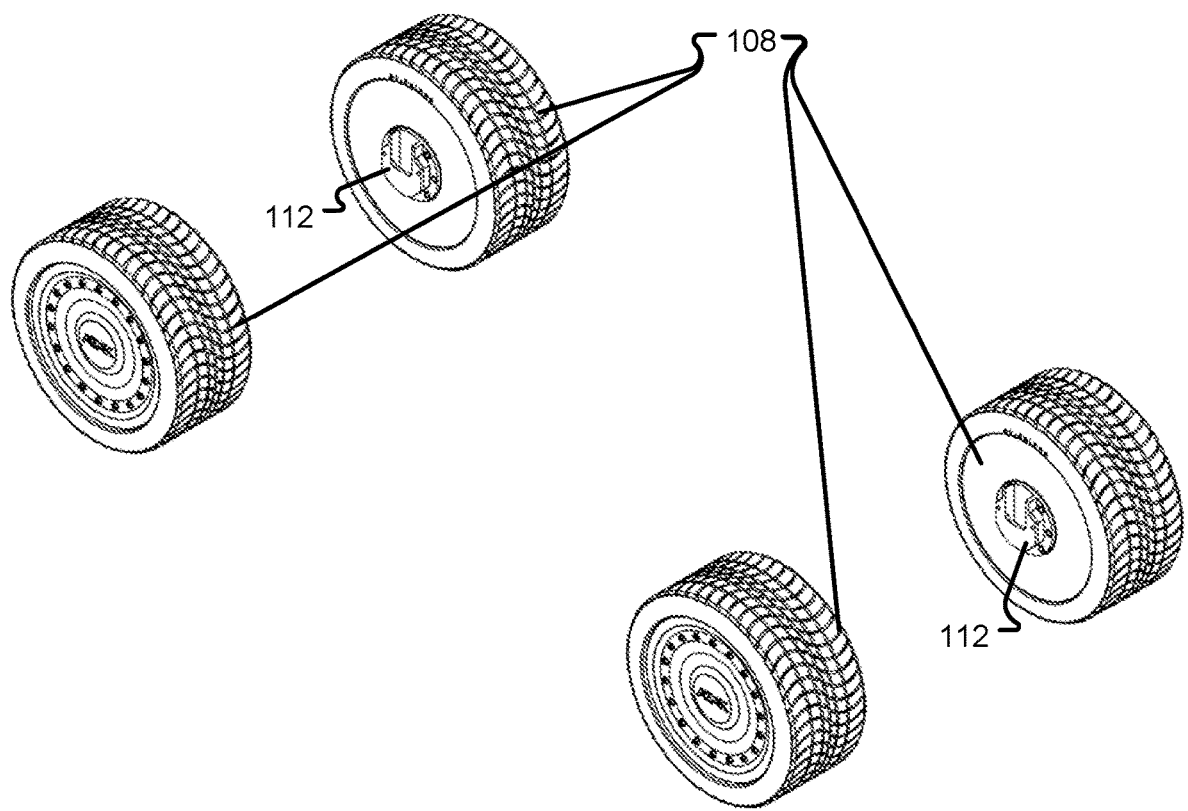
FIG. 2 illustrates a plurality of wheels according to embodiments of the present disclosure.

Although FIG. 2 illustrates the coupling receiver 112 as being mounted on a wheel 108, it should be appreciated that the coupling receiver 112 may be mounted on the vehicle frame 104 while the coupling is mounted on the wheel 108.

While FIGS. 1A-2 illustrate a first example of a vehicle 100, FIGS. 3A-8 illustrate another example of a vehicle 100. The illustrative vehicle 100 again shows a coupling receiver 112 mounted on each of the wheels 108 while a coupling 304 is mounted on the frame 104. In some embodiments, the coupling 304 and coupling receiver 112 may correspond to a coupling system 100 used to releasably, quickly, and efficiently couple/uncouple a wheel 108 to the vehicle frame 104.

In the embodiment of FIGS. 3A-8, the coupling 304 is shown to be mounted to a suspension 308 of the vehicle frame 104. The coupling 304 may be configured to interface with and be received by the coupling receiver 112. As a non-limiting example, the coupling 304 may correspond to a male coupling component whereas the coupling receiver 112 may correspond to a female coupling component. The coupling 304 may include dimensions and one or more features that enable the coupling 304 to fit within the coupling receiver 112, but that substantially prevent or prohibit rotation of the coupling receiver 112 relative to the frame 104. In this way, the wheel 108 may include an inner core onto which the coupling receiver 112 (or coupling 304) is mounted and the outer portion of the wheel 108 (e.g., a tire) may rotate around the core of the wheel 108. The relative alignment of the coupling receiver 112 and coupling 304 may remain substantially fixed, meaning that the portion of the coupling system mounted on the wheel 108 does not rotate relative to the vehicle frame 104. In some embodiments, the wheel 108 may include one or more components that enable the wheel 108 to rotate under an internal source of rotational energy (e.g., an internal motor in the wheel 108), thereby obviating the need to have the entire wheel 108 rotate relative to the vehicle frame 104.

Referring now to FIGS. 3B, 4B, 7, and 8B, additional details of the coupling system are shown. Specifically, the coupling 304 of the coupling system is shown to include a bottom end 312, one or more side edges 316, a frame-side face 324, and a wheel-side face 704. In some embodiments, the coupling 304 may include two side edges 316 (e.g., a front and back side edge) and each of the side edges 316 may provide a thickness of the coupling 304. Specifically, but without limitation, the side edges 316 may extend from the frame-side face 324 to the wheel-side face 704 and the distance between the two faces 324, 704 may be referred to as a thickness of the coupling 304.

The bottom end 312 may share the same thickness as the side edges 316 and a length of the bottom end 312 may correspond to a distance between the side edges 316 of the coupling 304. In some embodiments, a top end of the coupling 304 may have the same length as the bottom end 312. The length of the bottom end 312 and/or top end may be referred to as a width of the coupling 304. In some embodiments, the width of the coupling 304 (e.g., the dimension measured horizontally) is less than the height or length of the coupling 304. The height or length of the coupling 304 may correspond to a length between the bottom end 312 and top end of the coupling 304. In some embodiments, the length of the frame-side face 324 and/or length of the wheel-side face 704 may correspond to the height or length of the coupling 304. The height or length of the coupling 304 may be greater than a width of the coupling 304. Providing a coupling 304 of such dimensions may help the stability of the coupling system, may sustain supporting the weight of the vehicle frame 104 on the wheel 108, and may help substantially prevent the coupling 304 from rotating relative to the coupling receiver 112. In some embodiments, the thickness of the coupling 304 may correspond to the smallest of the three dimensions of the coupling 304.

The coupling 304 may also include one or more mating features 320. The mating feature 320 is shown to be provided as a notch or detent in the side edges 116, but it should be appreciated that one or more mating features 320 may be provided on any portion of the coupling 304 and/or coupling receiver 112 without departing from the scope of the present disclosure. In some embodiments, the mating feature 320 may be configured to interface with a mechanical lock that is provided in the coupling receiver 112. In some embodiments, and as will be discussed in further detail herein, the mechanical lock that interfaces with the mating feature 320 may be engaged and/or disengaged via operation of an actuator (e.g., a mechanical lever, a mechanical button, an electromagnetic actuator, an electromechanical actuator, etc.).

Figure 3A:
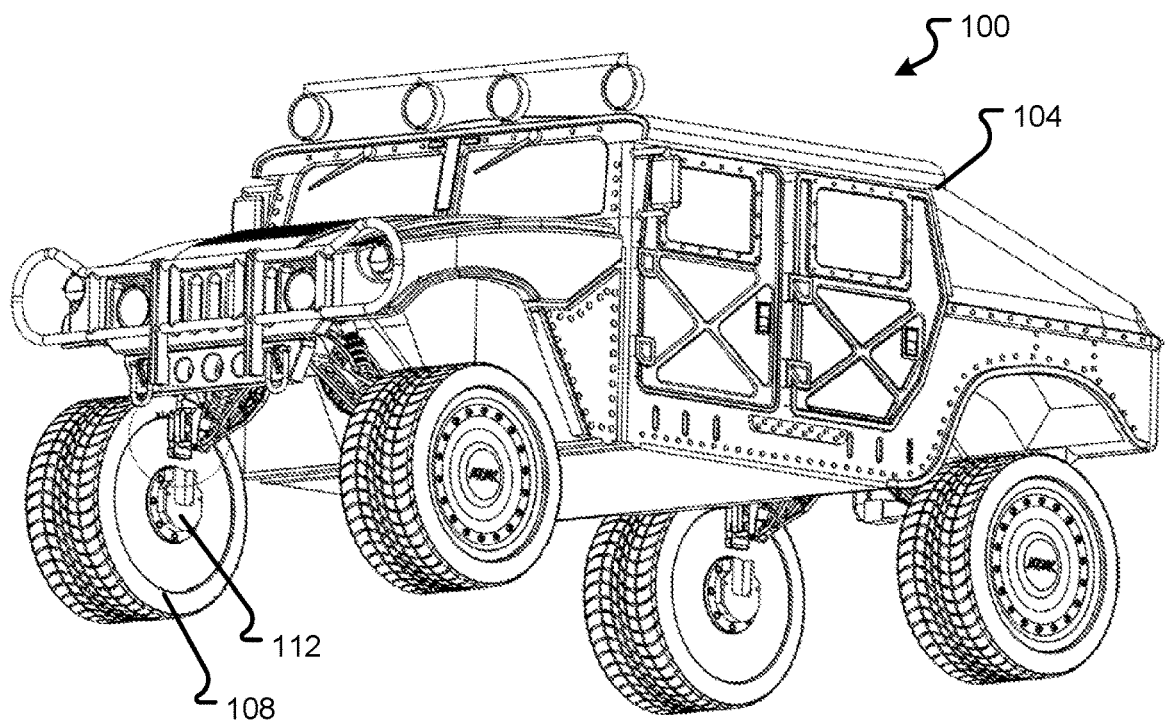
FIG. 3A is a bottom isometric view of a vehicle according to embodiments of the present disclosure.
Figure 3B:
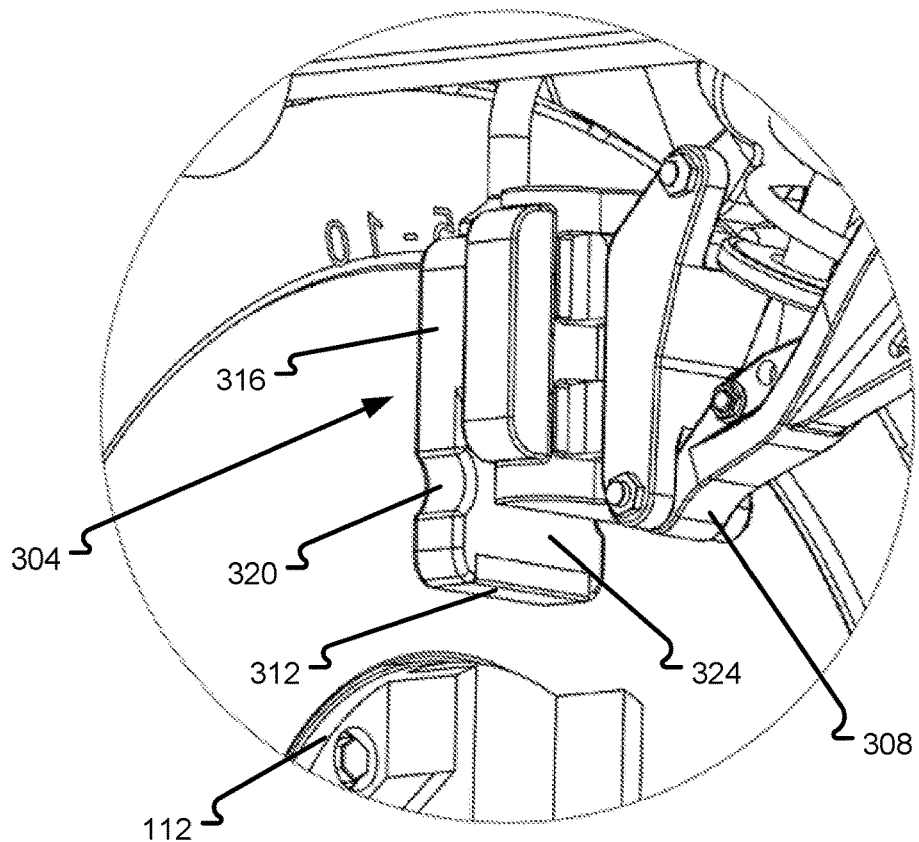
FIG. 3B is a magnified view of a coupling system in a first state.
Figure 4A:
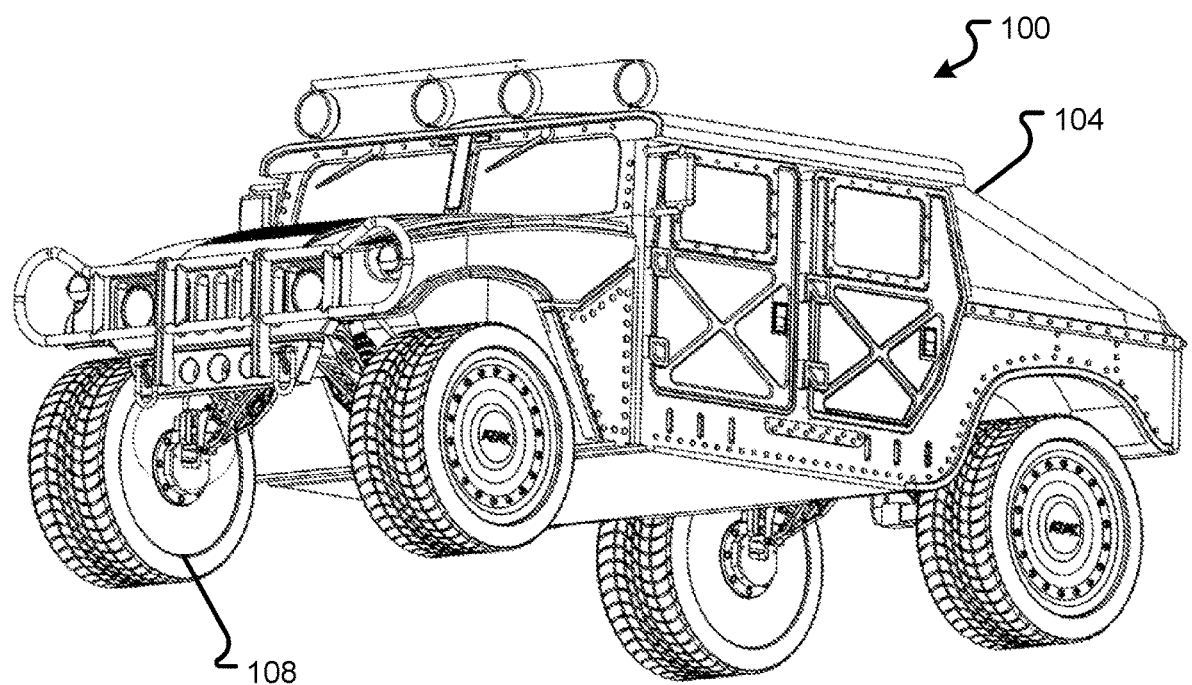
FIG. 4A is another bottom isometric view of a vehicle according to embodiments of the present disclosure.
Figure 4B:
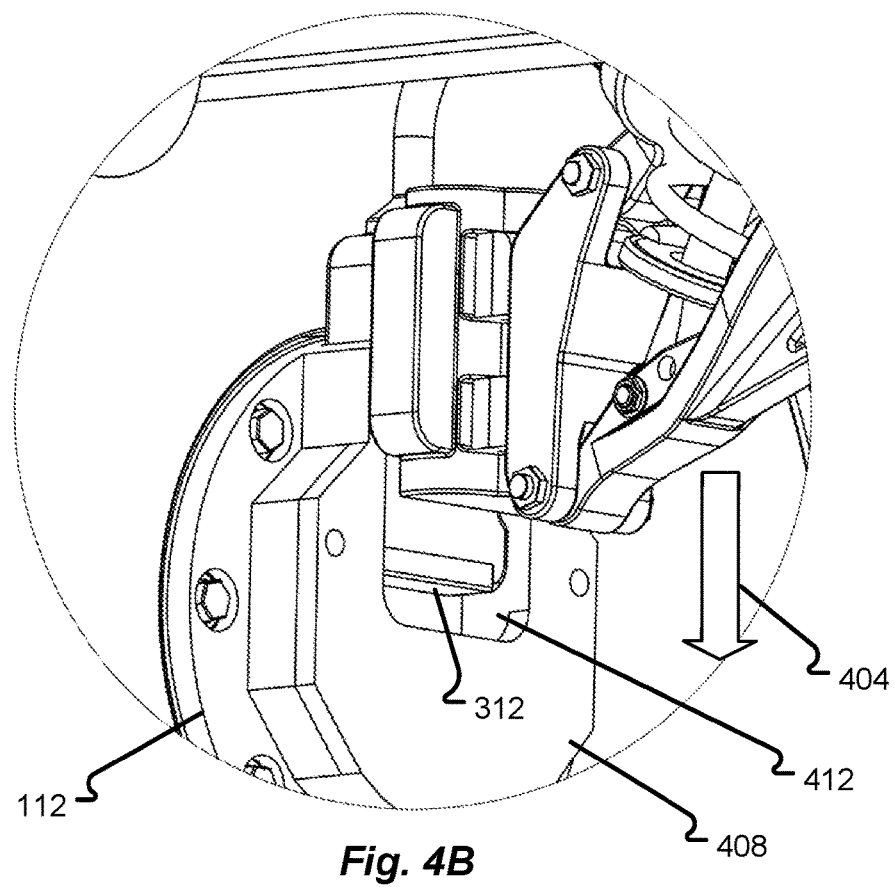
FIG. 4B is a magnified view of a coupling system in a second state.
Figure 5:
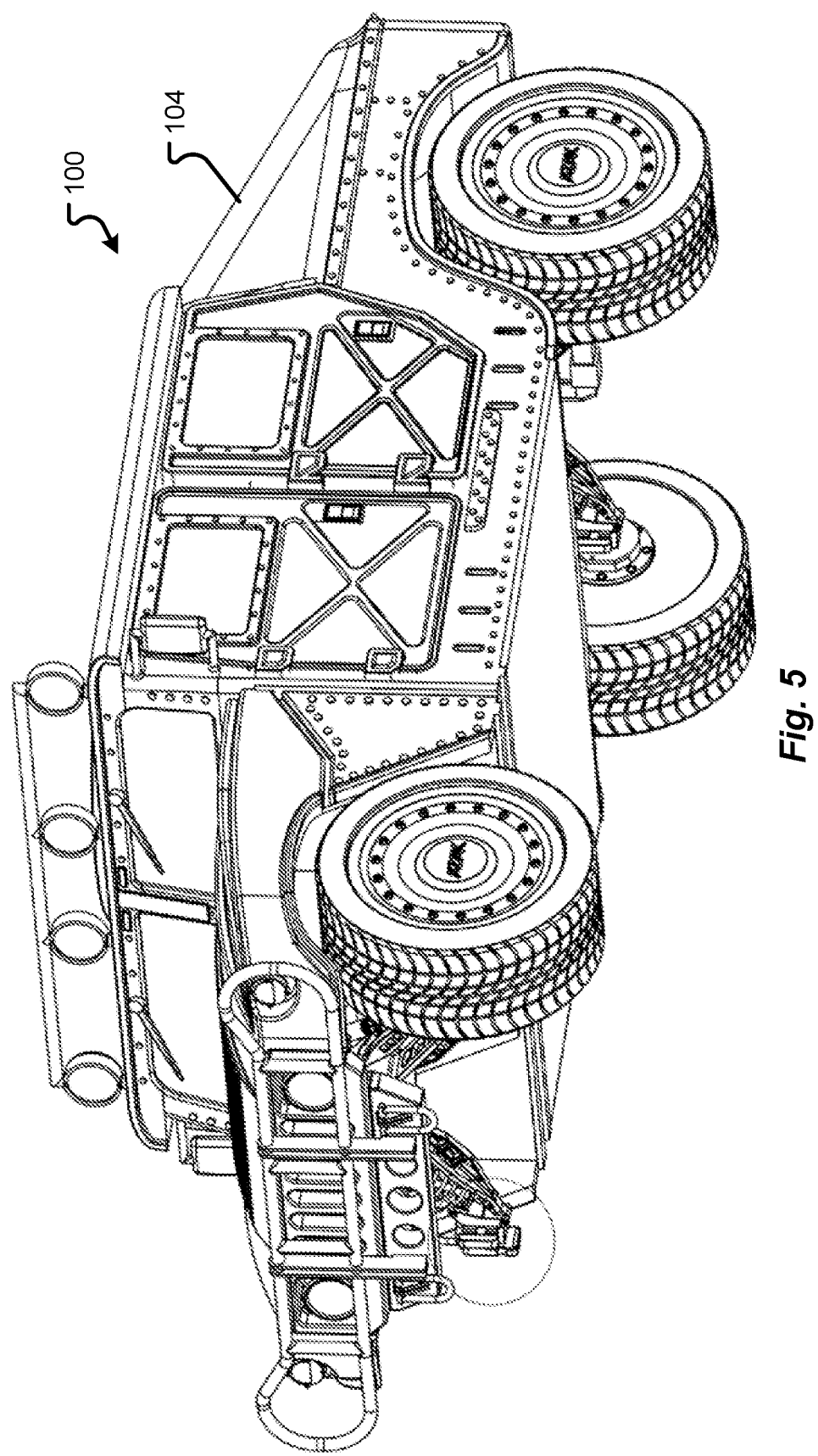
FIG. 5 is a bottom isometric view of a vehicle without a wheel according to embodiments of the present disclosure.
Figure 6:
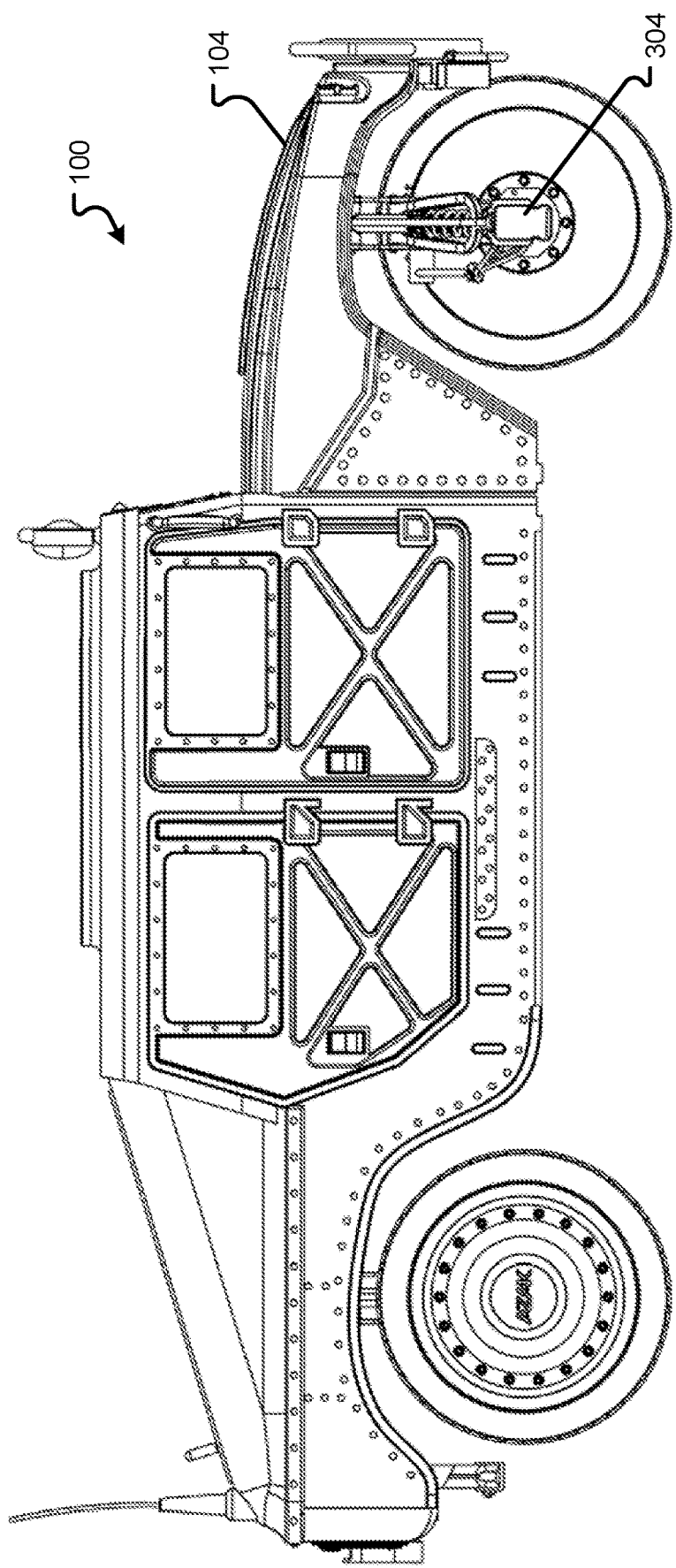
FIG. 6 is a side view of the vehicle shown in FIG. 5.
Figure 7:
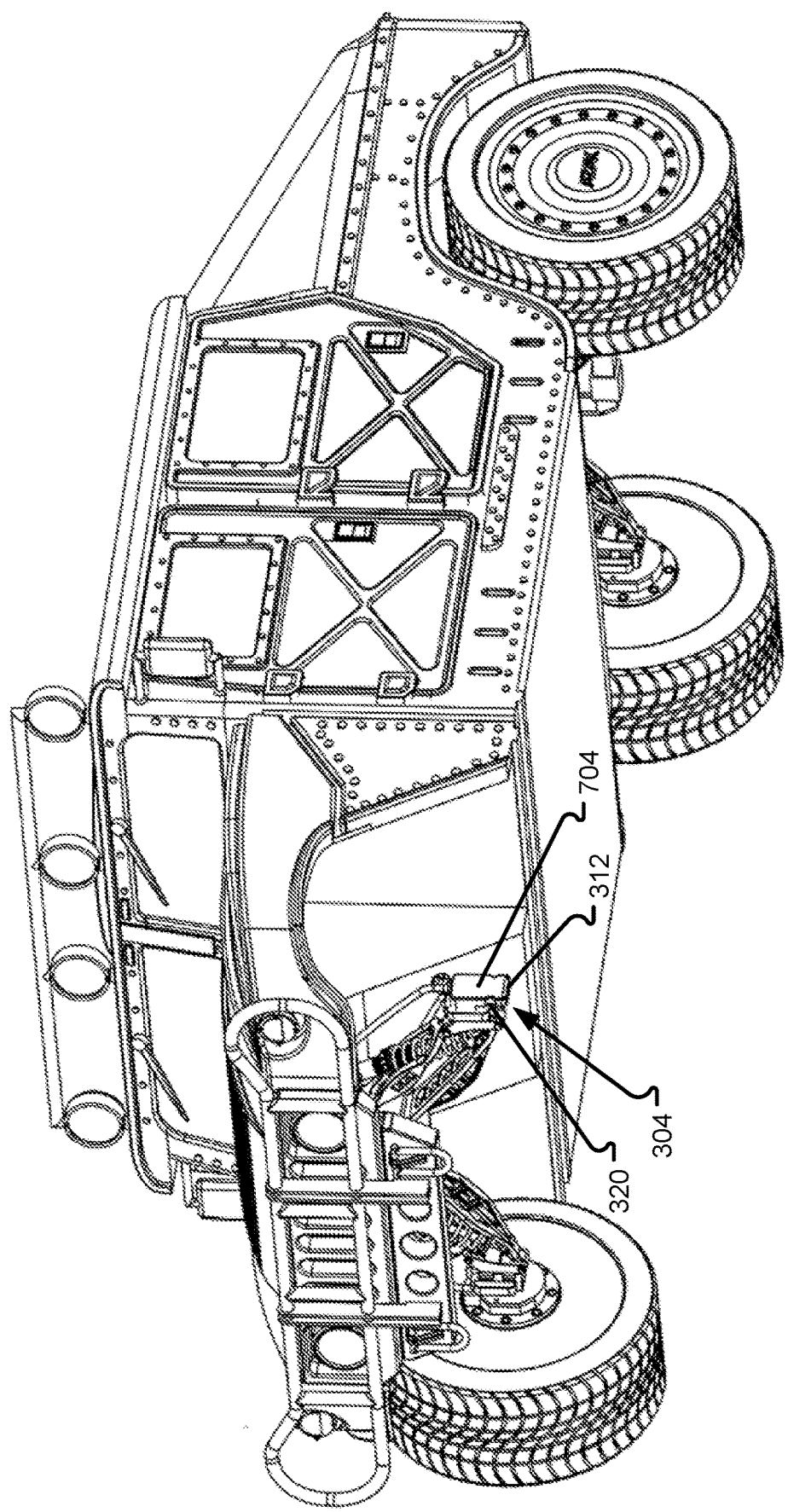
FIG. 7 is a bottom isometric view of another vehicle without a wheel according to embodiments of the present disclosure.

FIG. 3B illustrates a state of the vehicle frame 104 and wheel 108 in a first position having the vehicle frame 104 completely uncoupled from the wheel 108. FIG. 4B illustrates a possible motion of the vehicle frame 104 relative to the wheel 108 to assist in engaging the coupling system. Specifically, FIG. 4B illustrates a vertical coupling motion 404 in which the vehicle frame 104 is moved vertically (e.g., downward) such that the bottom end 312 of the coupling 304 engages with and slides into a receiver slot 412 of the coupling receiver 112. In the depicted embodiment, the receiver slot 412 is provided in a receiver body 408, which sits proud of the surface onto which the coupling receiver 112 is mounted to the wheel 108.

Figure 8A:
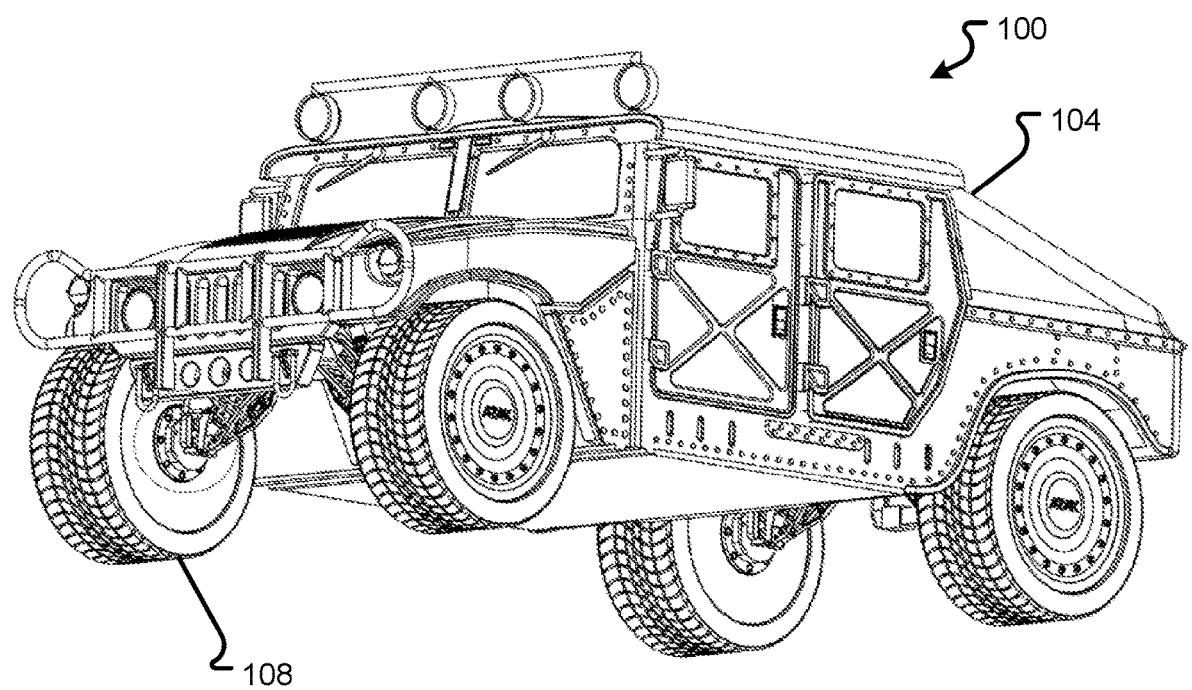
FIG. 8A is another bottom isometric view of a vehicle according to embodiments of the present disclosure.
Figure 8B:
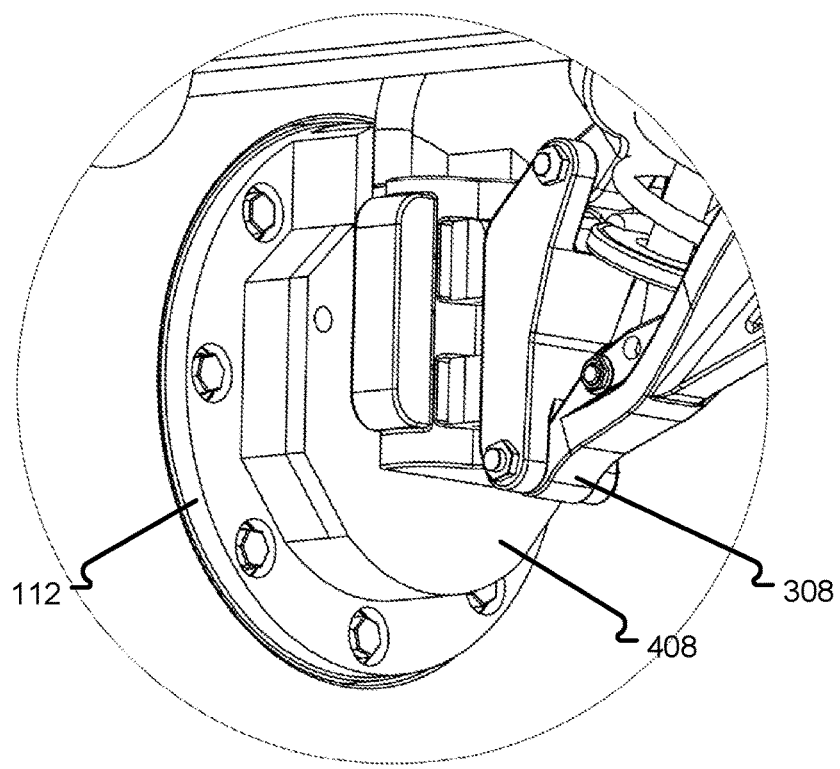
FIG. 8B is a magnified view of a coupling system in a third state.

FIG. 8 illustrates a relative position of the vehicle frame 104 and wheel 108 in which the coupling system is in a coupled state. More specifically, in the example of FIG. 8, the vehicle frame 104 has followed the vertical coupling motion 404 until the point where coupling 304 has slid completely into the receiver slot 412 and the bottom end 312 of the coupling 304 rests in the receiver body 408. In some embodiments, a portion of the receiver body 408 may support at least some weight of the vehicle frame 104 by interfacing with the bottom end 312 of the coupling 304. In the configuration of FIG. 8, the vehicle frame 104 may be considered to be in a coupled state with the wheel 108 (e.g., if the coupling system has been locked and rotation of the wheel 108 relative to the vehicle frame 104 is substantially opposed).

FIGS. 9-12 illustrate another example of a vehicle 100 in accordance with at least some embodiments of the present disclosure. The vehicle 100 is still shown to include a frame 104 and one or more wheels 108. The coupling system used to releasably connect the vehicle frame 104 to the wheel(s) 108 is shown to include the coupling receiver 112 and the coupling 304 that interfaces with the coupling receiver 112. In this example, the coupling receiver 112 is shown as being mounted to the wheel 108 whereas the coupling 304 is shown to be part of the vehicle frame 104. Of course, the coupling receiver 112 may be provided as part of the vehicle frame 104 whereas the coupling 304 may be mounted to the wheel 108.

These figures also illustrate the actuator 904 that can be provided on the coupling receiver 112. In some embodiments, the actuator 904 may be configured to move a mechanical lock that engages with the mating feature 320 when the coupling 304 is fully inserted into the coupling receiver 112. When locked, the coupling 304 provided on the vehicle frame 104 may be substantially prohibited from sliding out of the coupling receiver 112. In other words, the mechanical lock may substantially prohibit a translational or uncoupling motion 1004 of the vehicle frame 104 relative to the wheel 108. However, if the actuator is engaged or disengaged (as appropriate), then the mechanical lock may be released and the vehicle frame 104 may be allowed to travel in an uncoupling motion 1004. The uncoupling motion 1004 is shown as an upward motion of the vehicle frame 104 relative to the wheel 108. The uncoupling motion 1004 may allow the coupling 304 to slide out of the receiver slot 412, thereby allowing the bottom end 312 of the coupling 304 to travel beyond the receiver slot 412.

The actuator 904 can be manipulated directly or indirectly. In a direct manipulation, a user may physically press, physically pull, or otherwise physically manipulate the actuator 904, thereby causing the actuator 904 to move between a locked and unlocked position. In an indirect manipulation, the actuator 904 may be coupled to a solenoid, servo motor, motor controller, or other type of control device that receives a control signal from a remote input. The control signal may be transmitted from the remote input (e.g., a button, lever, switch, etc.) to the control device. Upon receiving the control signal, the control device may manipulate the actuator 904, thereby causing the actuator 904 to move between a locked and unlocked position. In some embodiments, the control signal may be transmitted wirelessly from the remote input to the control device. In such a configuration, the remote input and/or control device may be coupled to antennas that are configured to exchange signals with one another. In some embodiments, the control signal may be transmitted via a wired connection established between the remote input and the control device. Whether a wired or wireless connection is used, the remote input may be provided in a location of the vehicle 100 that is convenient for user access. For example, the remote input may be provided within the cab or cockpit of any vehicle 100 depicted or described herein. As another example, the remote input may be provided as a control lever on the handle or steering wheel of the vehicle 100. As another example, the remote input may be provided on an outward-facing side of the wheel 108, thereby allowing the user to manipulate the actuator 904 without having to reach underneath the vehicle 100.

While the coupling motion 404 and uncoupling motion 1004 have been depicted as corresponding to substantially vertical motions of the vehicle frame 104 relative to the wheel(s) 108, it should be appreciated that any type of non-vertical motions may be used for the coupling motion 404 and/or uncoupling motion 1004. The use of vertical motions allows wheels 108 to be replaced on a vehicle frame 104 by simply raising (e.g., jacking) the vehicle frame 104 upwards. However, it may also be possible to have the coupling motion 404 and/or uncoupling motion 1004 have a horizontal component (partially or entirely) depending upon the desired process for attaching or detaching a wheel 108 to/from a vehicle frame 104. The coupling motion 404 and/or uncoupling motion 1004 may have a complex pattern of motions (e.g., multiple components of different directions) if it is desired to have the coupling system 100 engage or disengage with more than a single, linear motion.

The vehicle 100 of FIGS. 9-12 illustrates the coupling 304 as being integrally formed with the vehicle frame 104. Said another way, the coupling 304 may correspond to a component of the vehicle 100 that is formed or cast as part of the vehicle frame 104. In other embodiments, however, the coupling 304 or coupling receiver 112 may be mounted to the vehicle frame 104 and/or wheel 108 by way of fasteners (e.g., screws, bolts, nuts, etc.), welding, adhesion, or the like.

Figure 9:
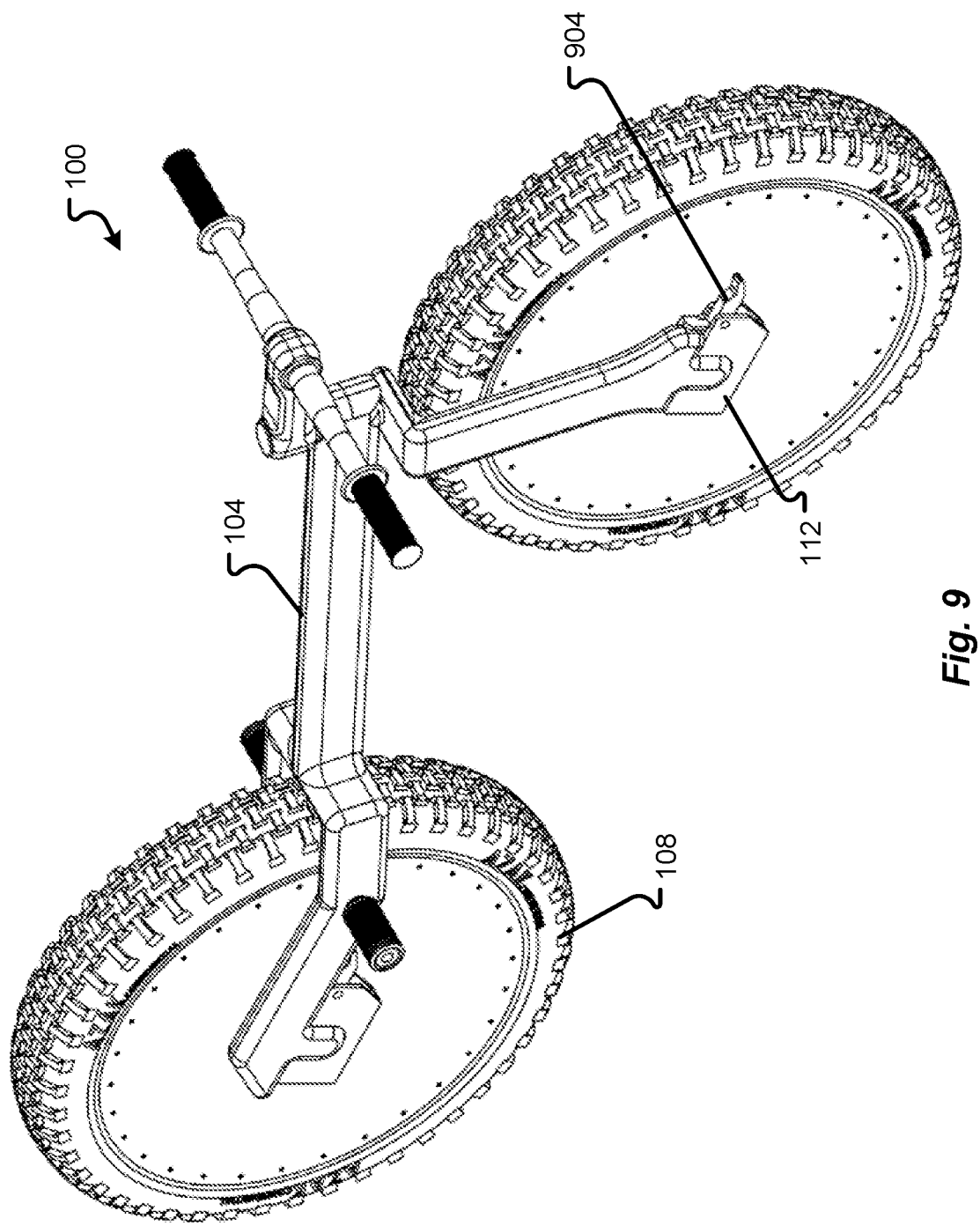
FIG. 9 is a top isometric view of another vehicle according to embodiments of the present disclosure.
Figure 10:
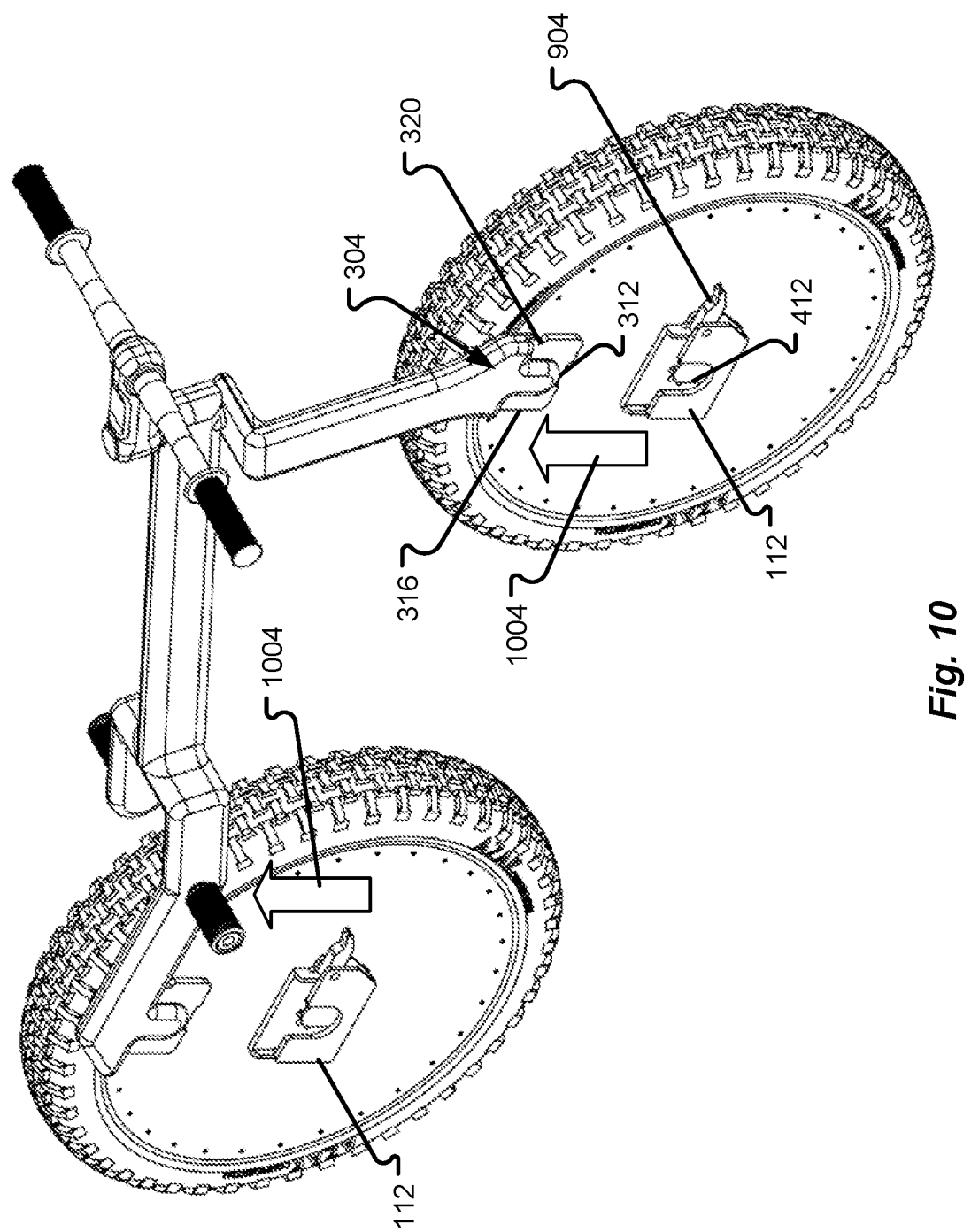
FIG. 10 is a top isometric view of the vehicle from FIG. 9 with the frame uncoupling from the wheels according to embodiments of the present disclosure.
Figure 11A:
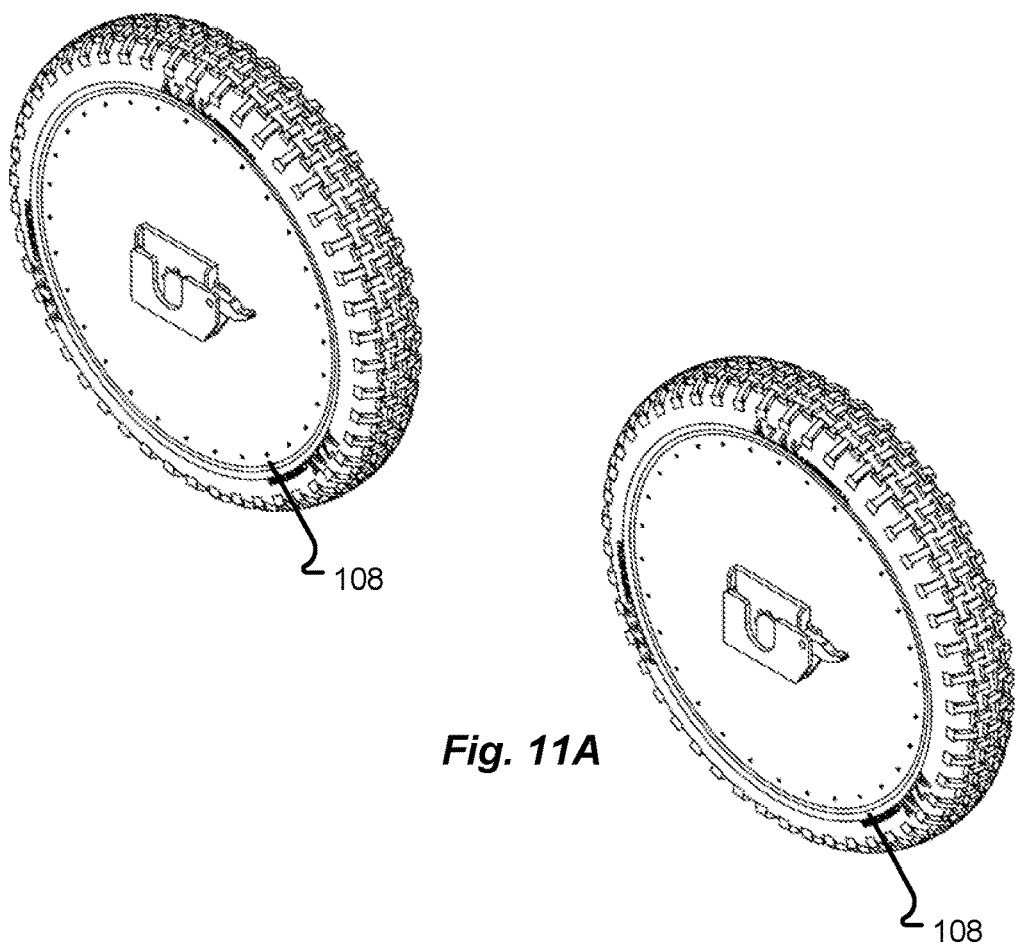
FIG. 11A is a top isometric view of wheels from the vehicle of FIG. 9.
Figure 11B:
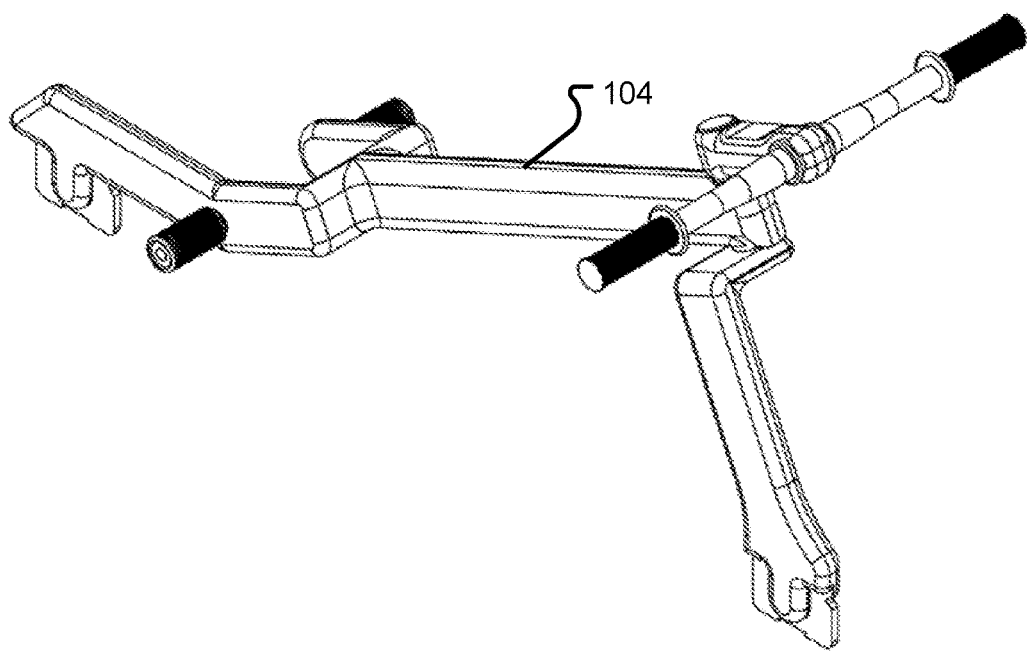
FIG. 11B is a top isometric view of a vehicle frame from the vehicle of FIG. 9.
Figure 12:
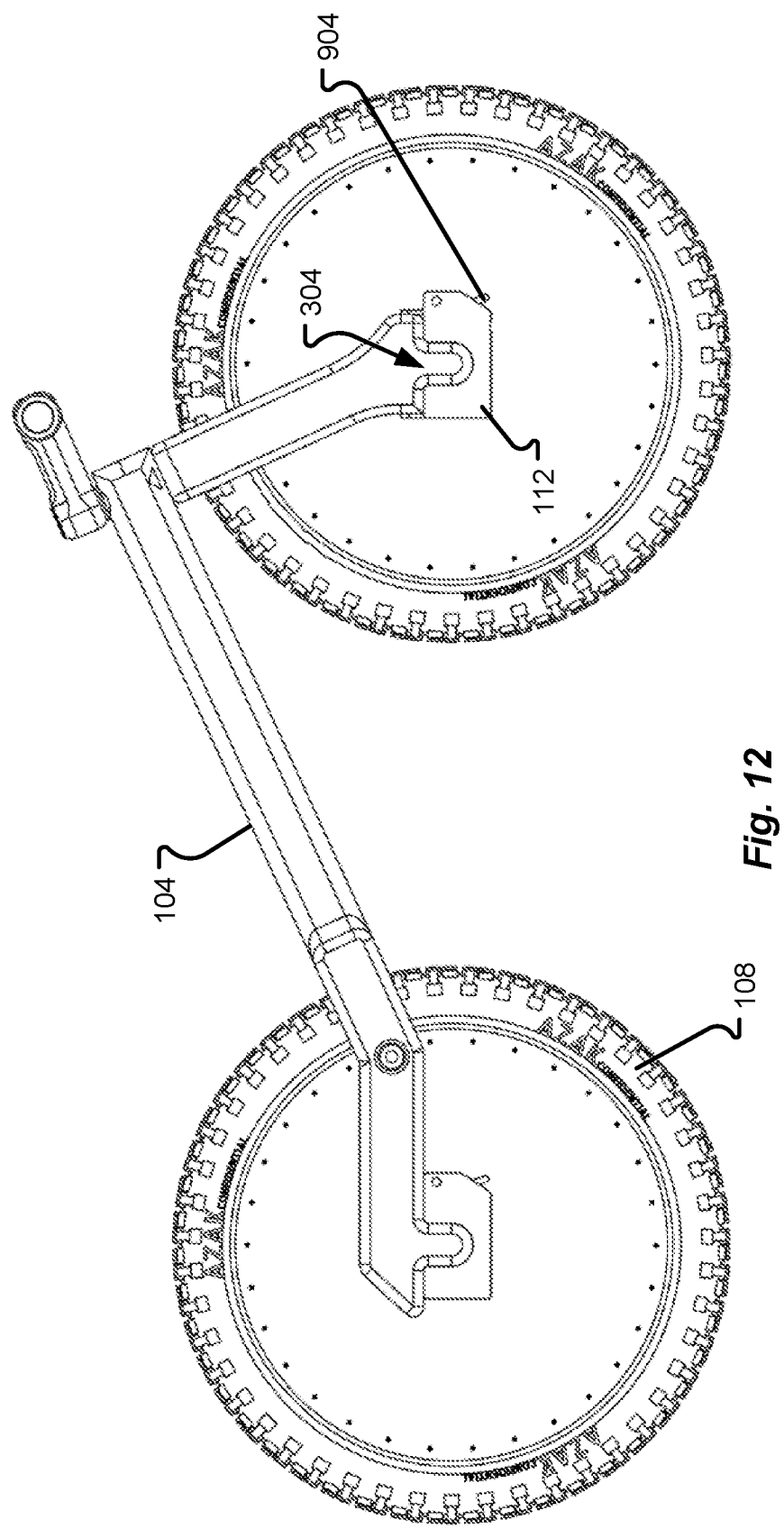
FIG. 12 is a side view of the vehicle from FIG. 9.

Whereas FIGS. 9-11 illustrate various steps for uncoupling wheel(s) 108 from the vehicle frame 104, FIG. 12 illustrates the coupling system in a coupled state. Specifically, FIG. 12 illustrates, as a non-limiting example, the coupling receiver 112 fully accepting the coupling 304 and the actuator 904 being provided in an engaged position, which pushes a mechanical lock in the coupling receiver 112 to interface with the mating feature 320 of the coupling 304.

Figure 13:
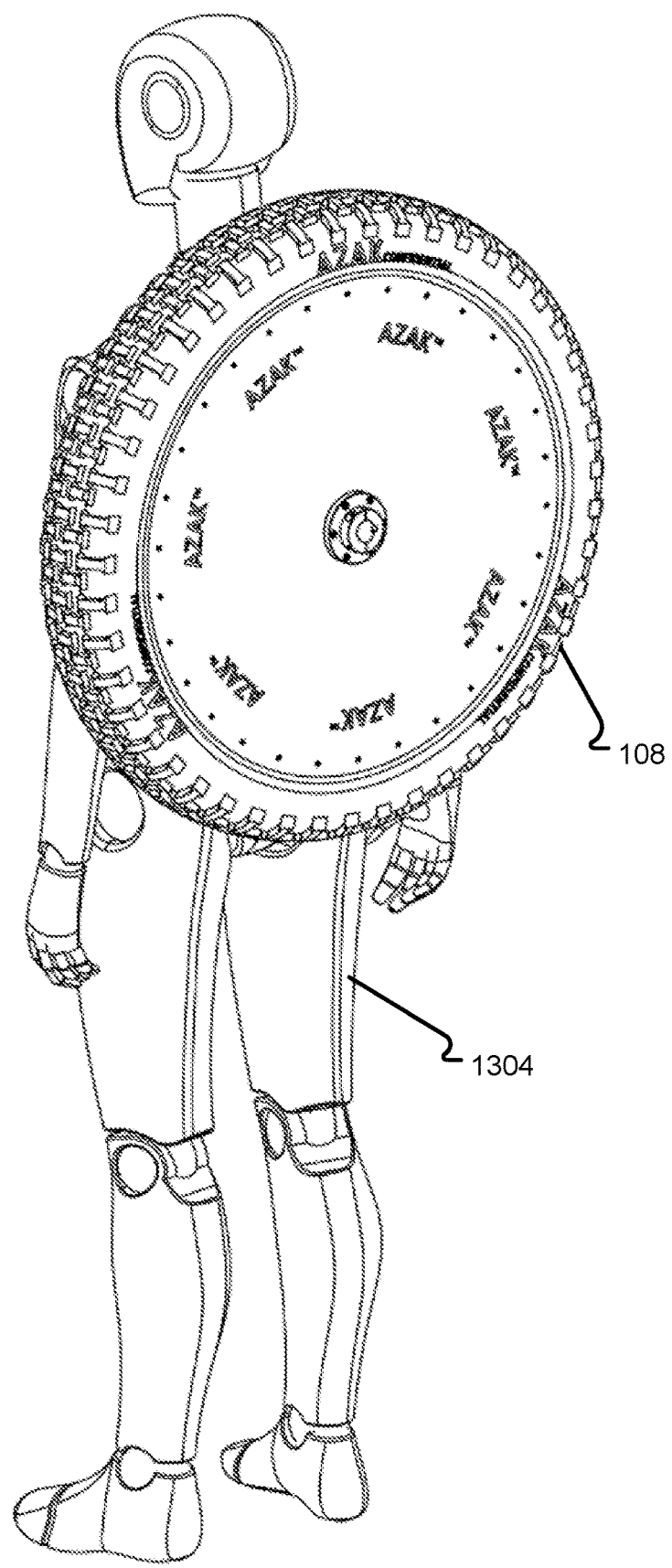
FIG. 13 illustrates a robot carrying a wheel in accordance with embodiments of the present disclosure.

FIG. 13 illustrates an example of a robot 1304 that may be used to carry a wheel 108 to or from a vehicle frame 104. In some embodiments, the robot 1304 may be configured to perform basic operations on the vehicle 100 (e.g., replace a wheel 108, carry a wheel 108 to a location of the vehicle 100, etc.). The type of wheel 108 carried by the robot 1304 may be suitable for replacing the wheel 108 already provided on a vehicle 100. While a robot 1304 is shown to be carrying the wheel 108, it should be appreciated that any type of transport mechanism may be used to carry a wheel 108 to/from a vehicle 100. For instance, a human may carry a wheel to or from a vehicle 100 as shown. A human or robot 1304 may be able to assemble a set of wheels 108 quickly onto any object of any kind (e.g., any object may be utilized to create a vehicle 100), by simply attaching the male (or female) quick attach, then attaching the wheels 108 to that object. The modular configuration of the wheels 108 enable the wheels 108 to be packed into remote areas relatively easily and then attach to any type of object (e.g., a stretcher, a safe, a box, a crate, munitions, etc.).

FIGS. 14-24B illustrate other examples of a vehicle 100. The wheels 108 provided in the vehicle(s) 100 of FIGS. 14-24B may be similar or identical to the wheels 108 used on other vehicles 100 depicted and described herein (e.g., the vehicle of FIGS. 9-11). Again, the vehicle 100 is shown to include a vehicle frame 104 and a number of wheels 108. One, some, or all of the wheels 108 may be connected to the vehicle frame 104 with a coupling system. As can be seen in the progression of FIGS. 14-17, the vehicle frame 104 may be moved relative to the wheel(s) 108 to uncouple the wheels 108 from the vehicle frame 104. In some embodiments, if each of the coupling receivers 112 of each wheel 108 is unlocked at the same time, then the vehicle frame 104 may move in the uncoupling motion 1004 to uncouple the vehicle frame 104 from all of the wheels 108 at substantially the same time. This uncoupling process may allow all of the wheels 108 to be replaced with other wheels, if desired, at substantially the same time.

Figure 14:
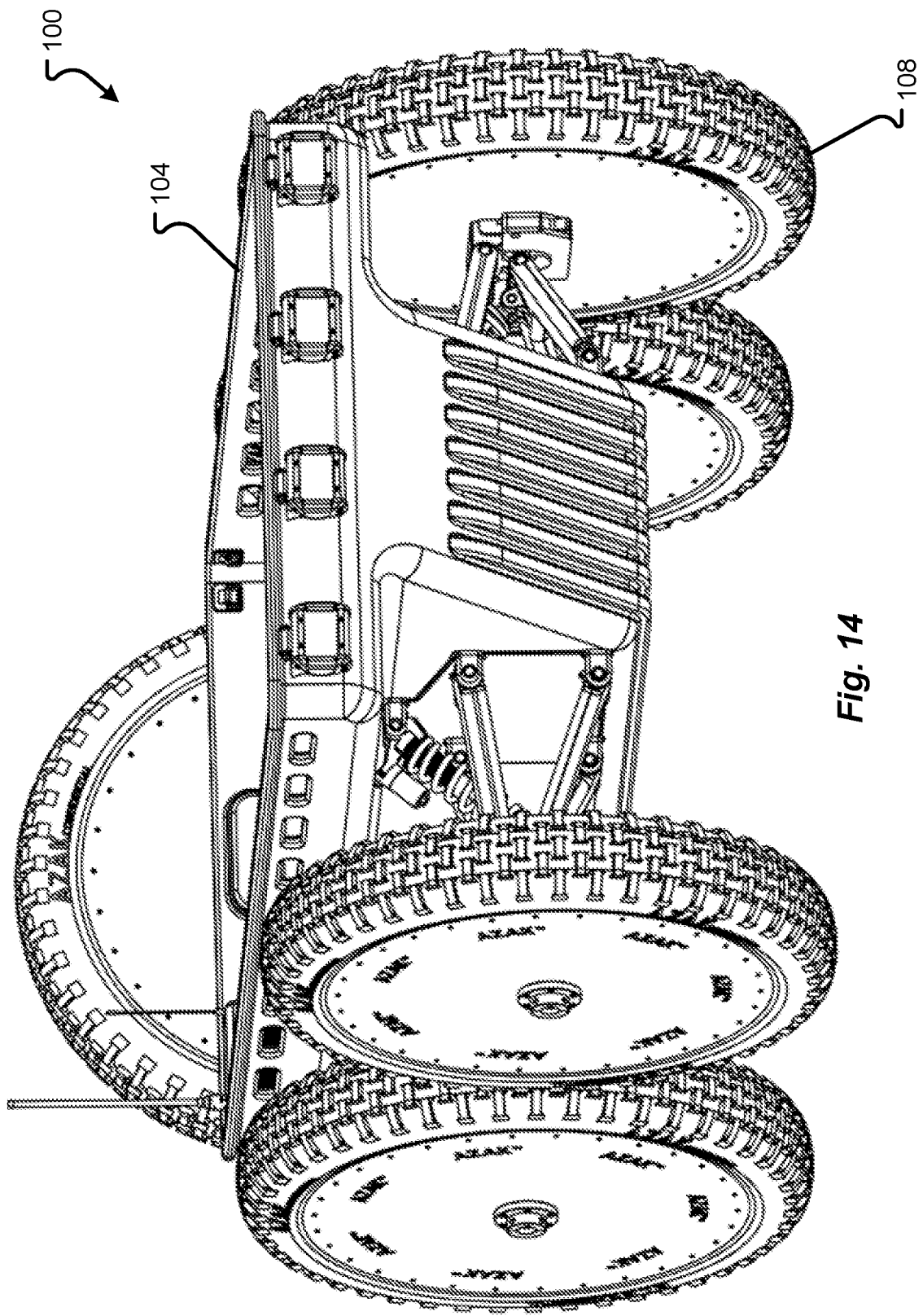
FIG. 14 is an isometric view of another vehicle according to embodiments of the present disclosure.
Figure 15:
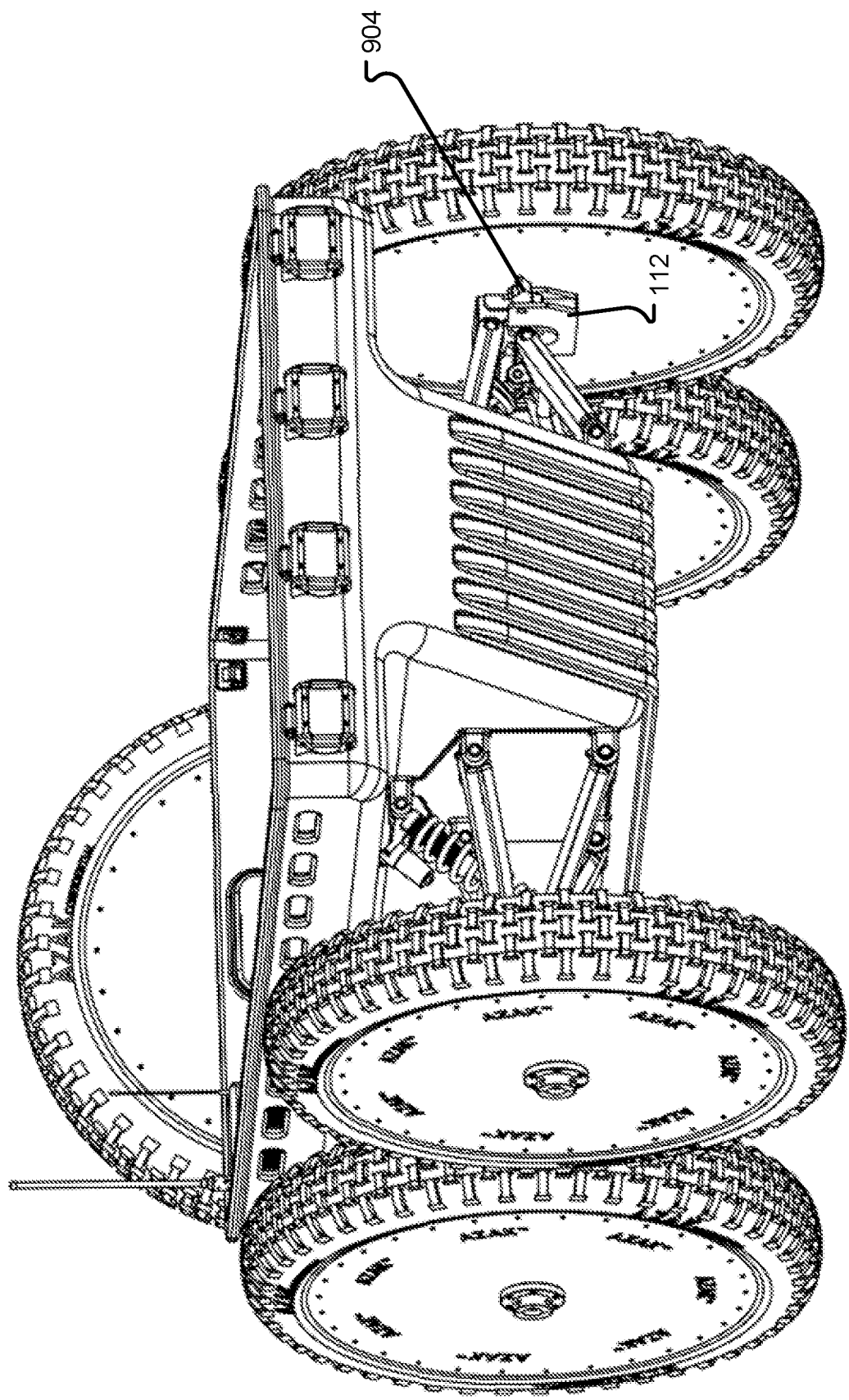
FIG. 15 illustrates the vehicle from FIG. 14 with an actuator disengaged according to embodiments of the present disclosure.
Figure 16:
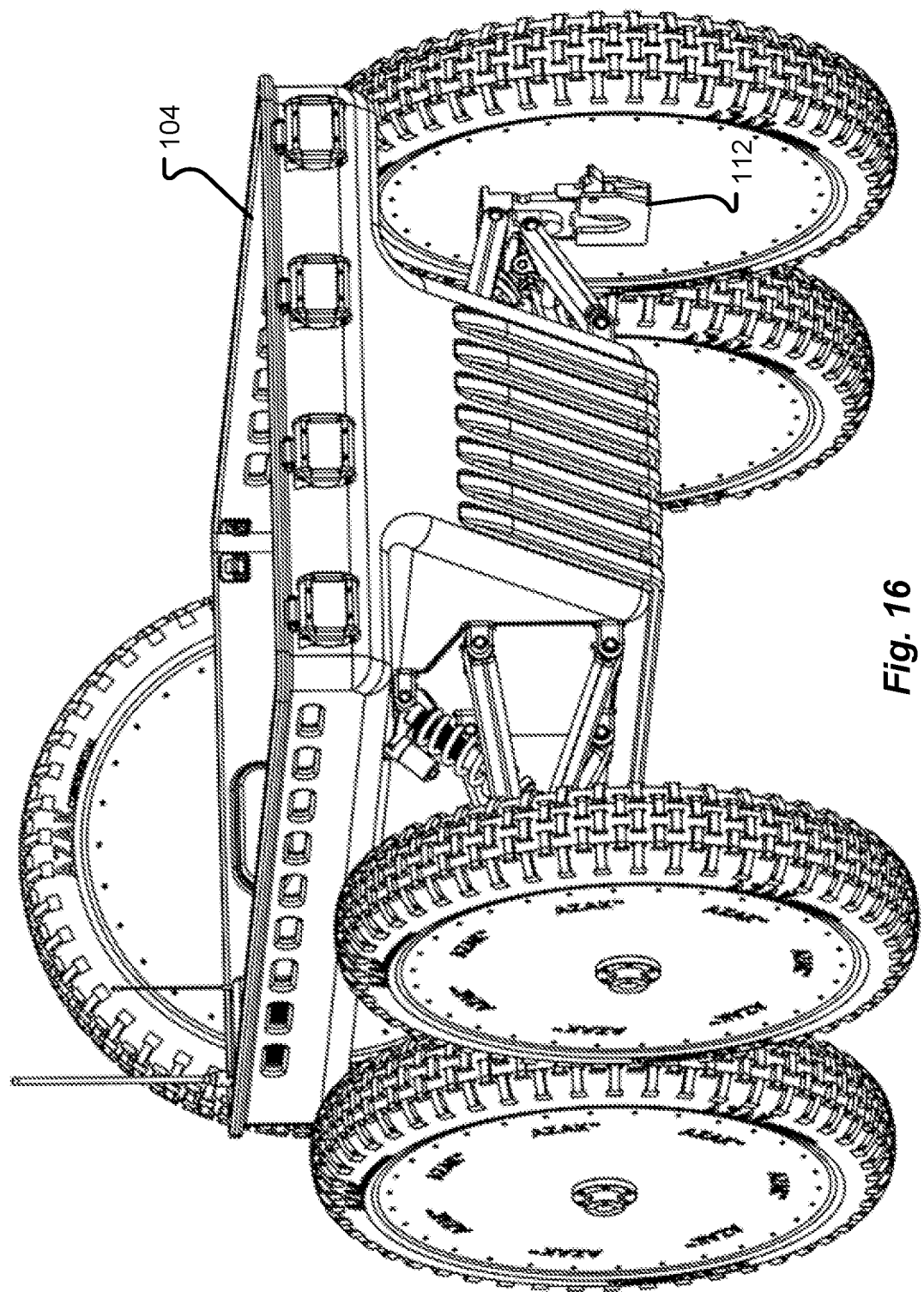
FIG. 16 illustrates the vehicle from FIG. 14 with the frame uncoupling from the wheels according to embodiments of the present disclosure.
Figure 17:
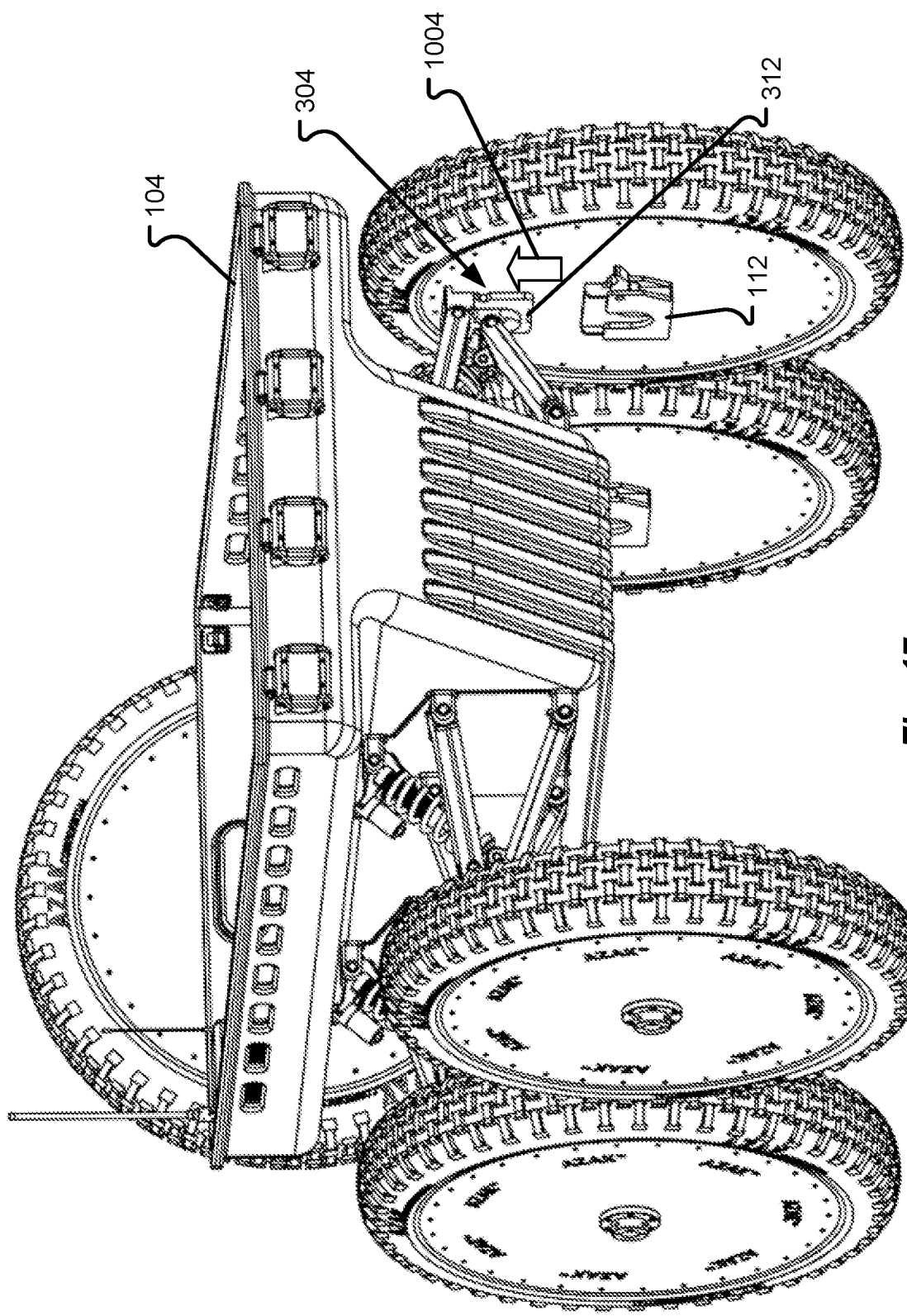
FIG. 17 illustrates the vehicle from FIG. 15 with the frame further uncoupled from the wheels according to embodiments of the present disclosure.
Figure 18:
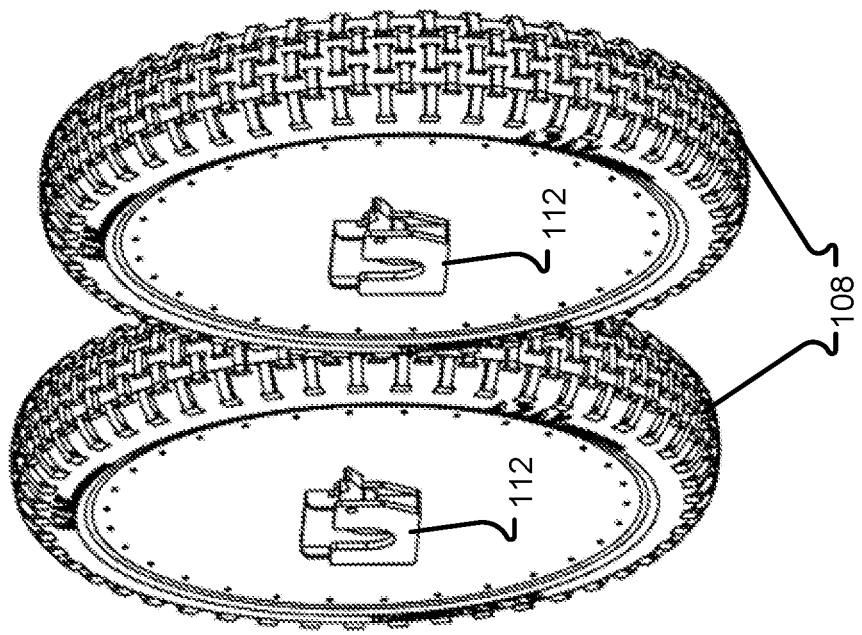
FIG. 18 illustrates a plurality of wheels according to embodiments of the present disclosure.
Figure 18:
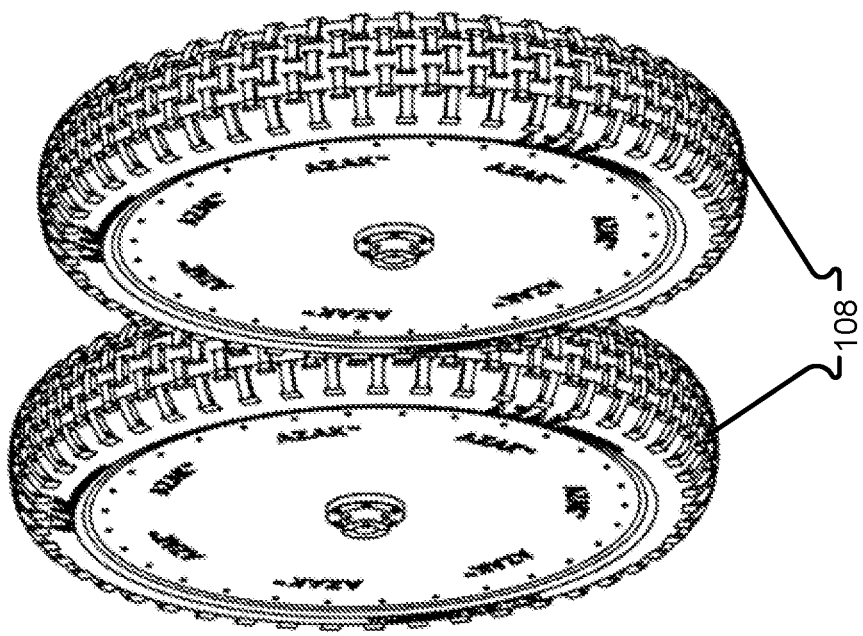

FIG. 14 is depicted to include a plurality of wheels 108 connected to a particular type of vehicle frame 104 using one type of steering technology. It should be appreciated that any type of vehicle frame 104 and/or any type of steering technology may be used to: (1) mount the wheels 108 to the vehicle frame 104 and/or (2) steer the wheels 108 when mounted to the vehicle frame 104. For instance, a traditional rack and pinion steering system may be used to mount the wheels 108 to the vehicle frame 104. Alternatively or additionally, because one or more of the wheels 108 may be provided with an independent source of rotational energy, it may be possible to use a steering technology that does not require rotational forces to be translated from the vehicle frame 104 to the wheels 108. As an example, one, some, or all of the wheels 108 may be configured to be steered independently of one another. More specifically, but without limitation, an independent steering system may be employed where one of the wheels 108 is configured to steer independently of all other wheels 108. Examples of suitable, but non-limiting, types of steering systems that may be employed by the vehicle are described in further detail in Korean Patent Publication No. KR 10-1004957; U.S. Patent Publication No. 2019/0225268; U.S. Pat. Nos. 8,701,801; and 9,950,703, each of which are hereby incorporated herein by reference in their entirety.

Figure 19:
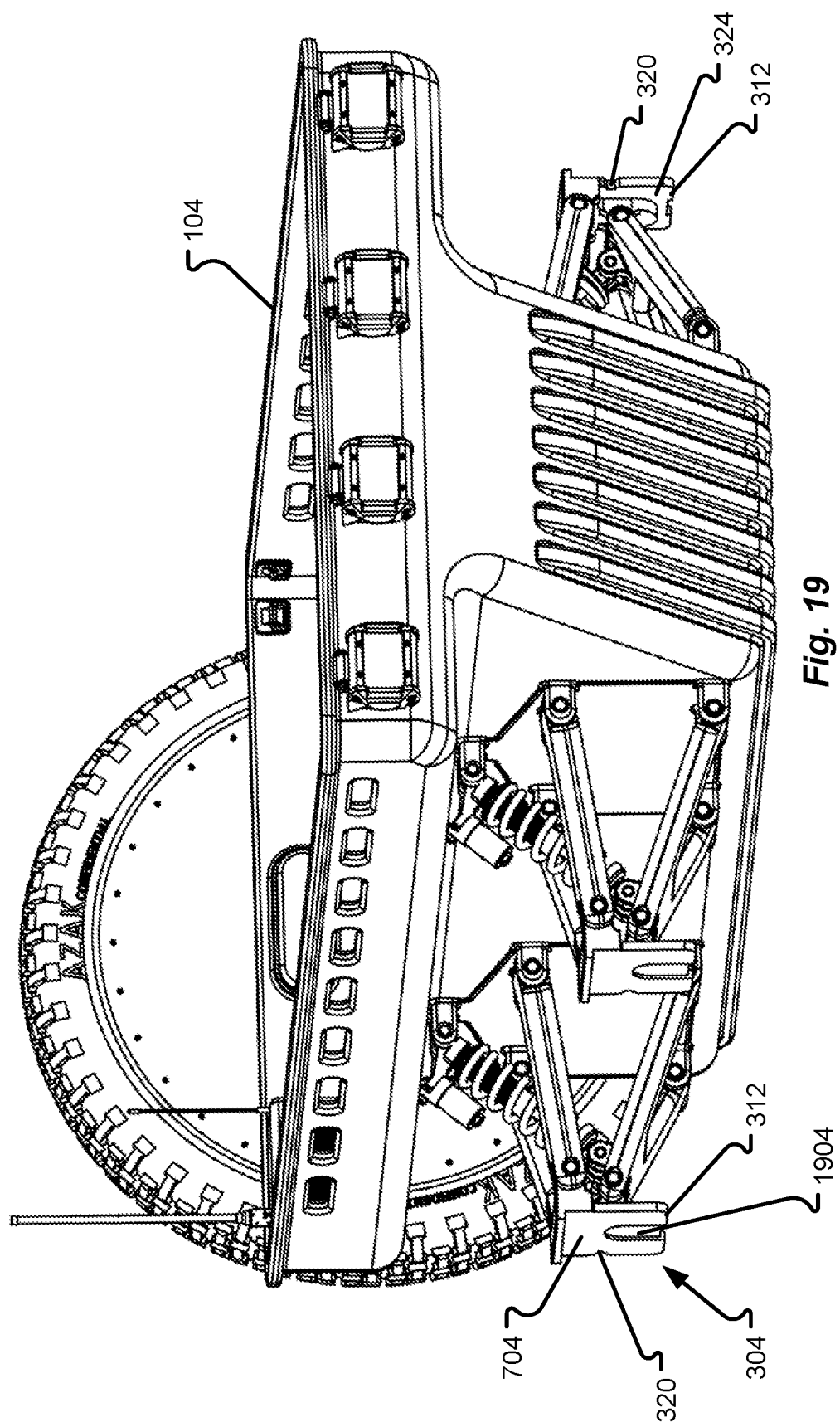
FIG. 19 illustrates a vehicle frame according to embodiments of the present disclosure.

FIG. 19 shows an additional alignment feature 1904 that may be provided in the coupling system. In some embodiments, the frame-side face 324 and/or wheel-side face 704 may be provided with a slot, notch, depression, or other type of alignment feature that helps align the coupling 300 as it travels into the receiver slot 412. For instance, the alignment feature 1904 may help to align the coupling system against horizontal translational movement while the coupling 304 travels into or out of the coupling receiver 112 in a vertical motion. While the mating feature 320 is shown to be provided on an orthogonal surface or edge from the alignment feature 1904, it should be appreciated that the alignment feature 1904 could also serve as a mating feature 320.

With reference now to FIGS. 20A-24B, additional details of wheels 108 and wheel components will be described in accordance with at least some embodiments of the present disclosure. Any components or features of a wheel 108 depicted or described in connection with the following figures may be provided in any of the other wheels 108 without departing from the scope of the present disclosure.

Figure 20A:
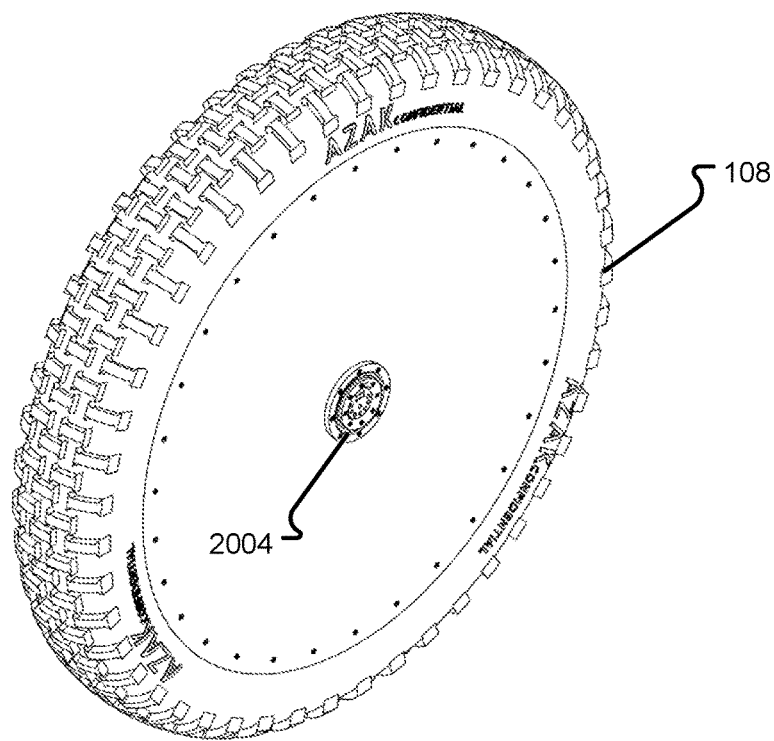
FIG. 20A illustrates a first side of another example of a wheel according to embodiments of the present disclosure.
Figure 20B:
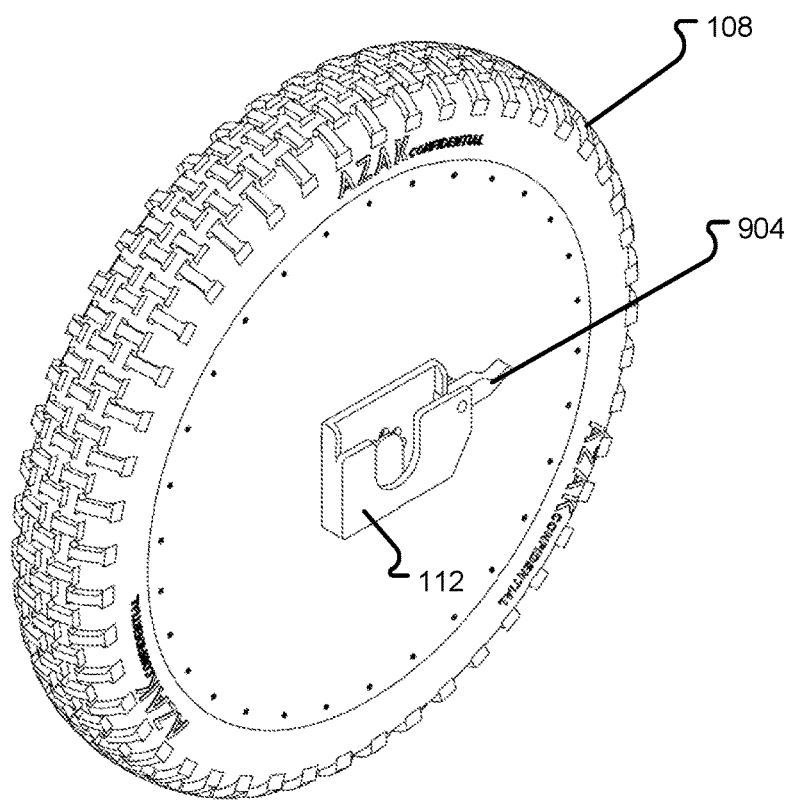
FIG. 20B illustrates the wheel of FIG. 20A with a coupling receiver mounted thereto according to embodiments of the present disclosure.
Figure 21A:
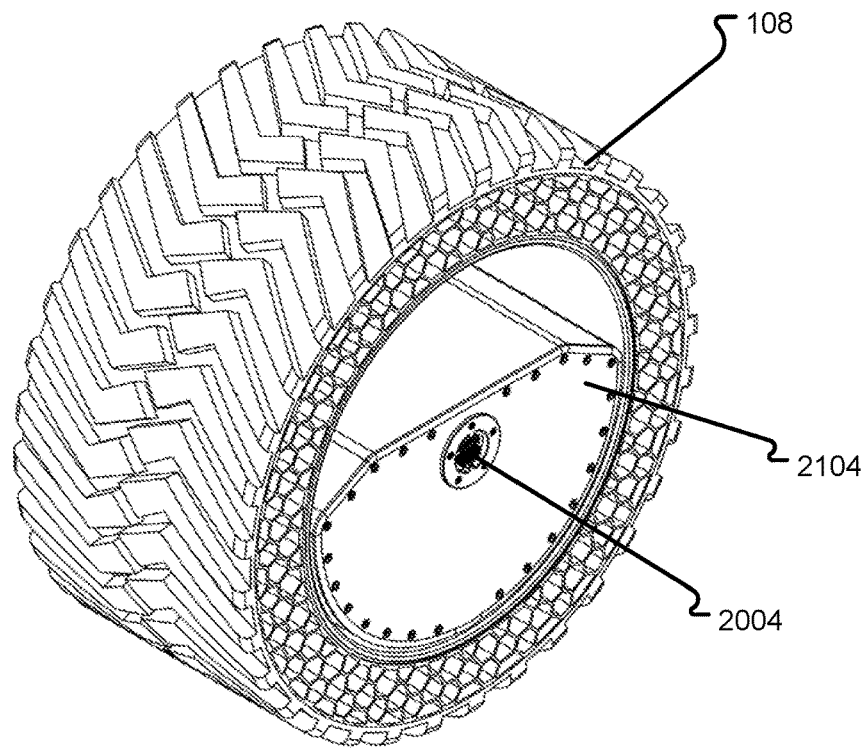
FIG. 21A illustrates a first side of another example of a wheel according to embodiments of the present disclosure.
Figure 21B:
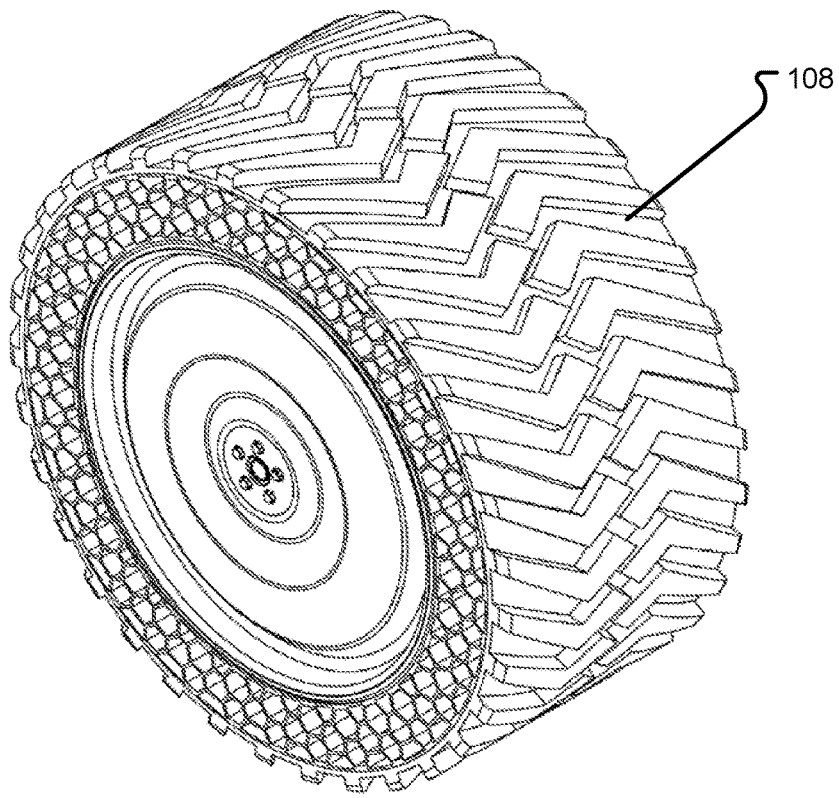
FIG. 21B illustrates a second side of the wheel from FIG. 21A.

The wheel 108 depicted in FIG. 20A and 20B is shown to include an electrical interconnect 2004. The electrical interconnect 2004 may be provided at a location that substantially aligns with a portion of the coupling system that is mounted to the wheel 108. For instance, the electrical interconnect 2004 may be provided at a location that is near where the coupling receiver 112 is mounted to the wheel 108.

In some embodiments, the electrical interconnect 2004 may provide an electrical pathway between electrical components provided in the wheel 108 and electrical components supported by the vehicle frame 108. For instance, the wheel 108 may include one or more motors that are used to power rotation of the wheel 108 around the coupling receiver 112. As a more specific, but non-limiting example (e.g., with reference to FIGS. 20A-24B), the electrical interconnect 2004 may provide an electrical pathway between electrical components provided in a wheel core 2104 and electrical components supported by the vehicle frame 104. The electrical interconnect 2004 may further include a number of pins 2204 (or pin receptacles) that carry an electrical signal (e.g., current) between the electrical components provided in the wheel core 2104 and the electrical components supported by the vehicle frame 104. As some non-limiting examples, the electrical components provided in the wheel core 2104 may include a motor controller 2408, a power supply for the motor (e.g., batteries), wireless transceivers, etc.

As shown in FIGS. 21A and 23A-24B, the wheel core 2104 may include a housing 2308 that is configured to contain or support components of the wheel core 2104. The wheel core 2104 may also include a gear box 2304 that connects a motor contained in the wheel core 2104 to a rotational portion of the wheel 108 (e.g., a tire) that rotates around the wheel core 2104. As described above, because the coupling system may substantially prevent the wheel core 2104 from rotating relative to the vehicle frame 104, the wheel core 2104 may include internal components that impart rotational forces on the wheel 108, thereby causing the wheel to rotate around the wheel core 2104. The gear box 2304 may include gears, sprockets, belts, or the like that transfer rotational energy from a motor into rotational energy for the wheel 108.

In some embodiments, some or all of the components provided in the wheel core 2104 may be positioned below an axis of rotation of the wheel 108. Providing some or all of the components of the wheel core 2104 below the axis of rotation can help to improve the stability of the wheel 108 and stability of the vehicle 100. As it may be desirable to enable communications among a plurality of the wheels 108, the electrical interconnects 2004 of each wheel 108 may provide a conduit for enabling control signals to be relayed between wheels 108 and/or between a centralized controller mounted on or supported by the vehicle frame 104.

Figure 22A:
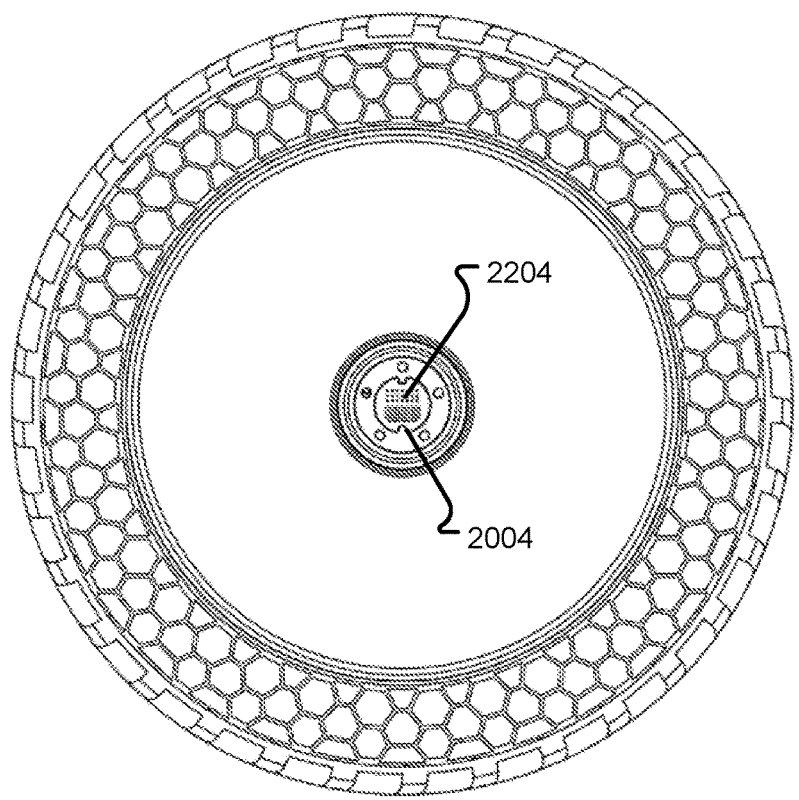
FIG. 22A is a side view of another example of a wheel according to embodiments of the present disclosure.
Figure 22B:
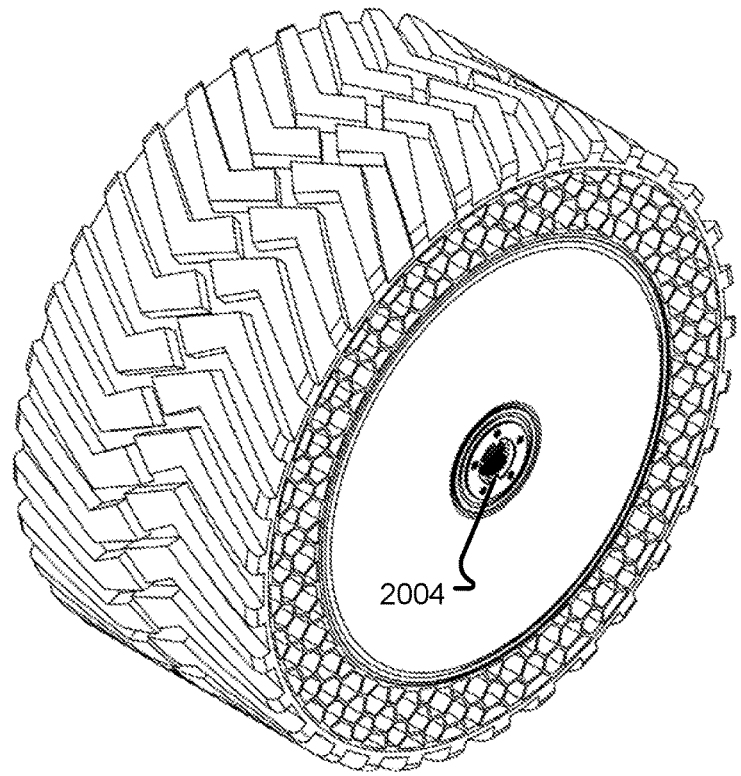
FIG. 22B is an isometric view of the wheel shown in FIG. 22A.
Figure 23A:
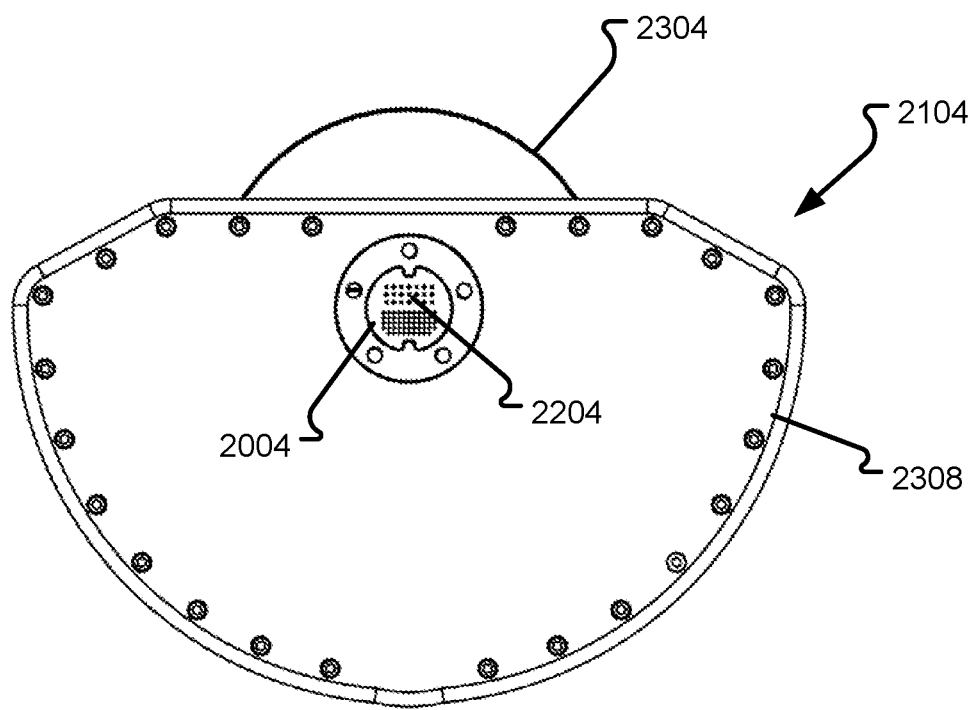
FIG. 23A is a side view of a first side of a wheel core according to embodiments of the present disclosure.
Figure 23B:
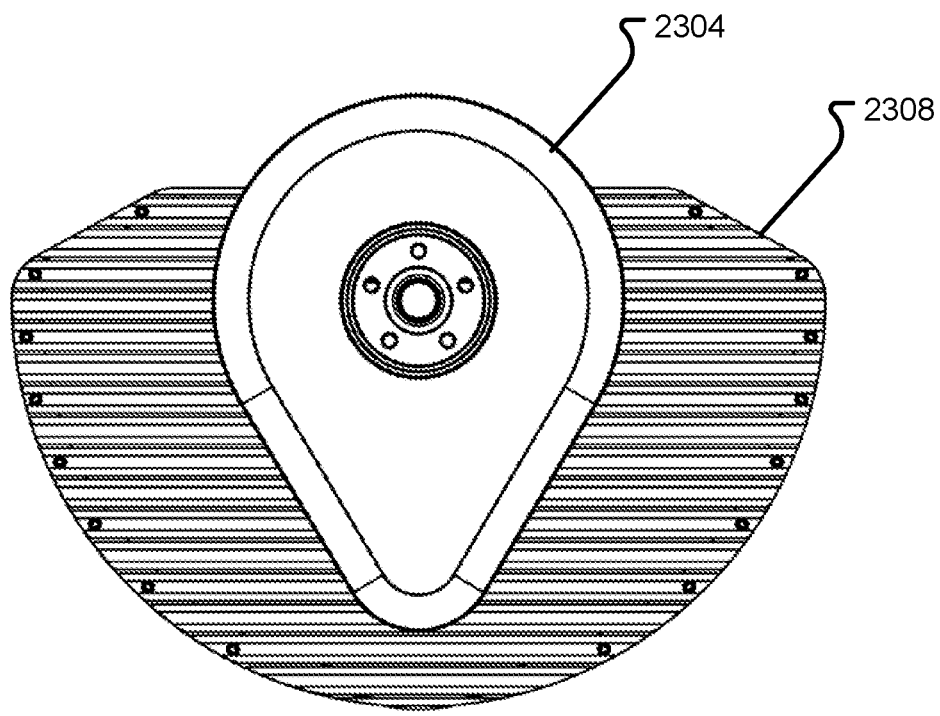
FIG. 23B is a side view of a second side of the wheel core shown in FIG. 23A.
Figure 24A:
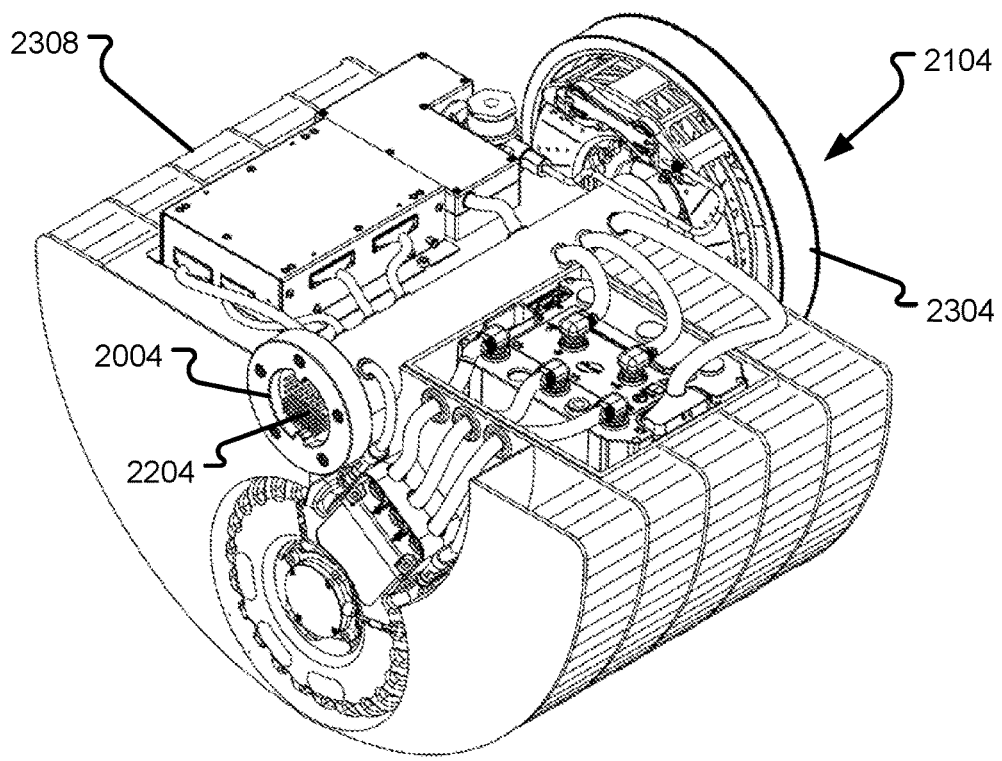
FIG. 24A is an isometric view of another wheel core according to embodiments of the present disclosure.
Figure 24B:
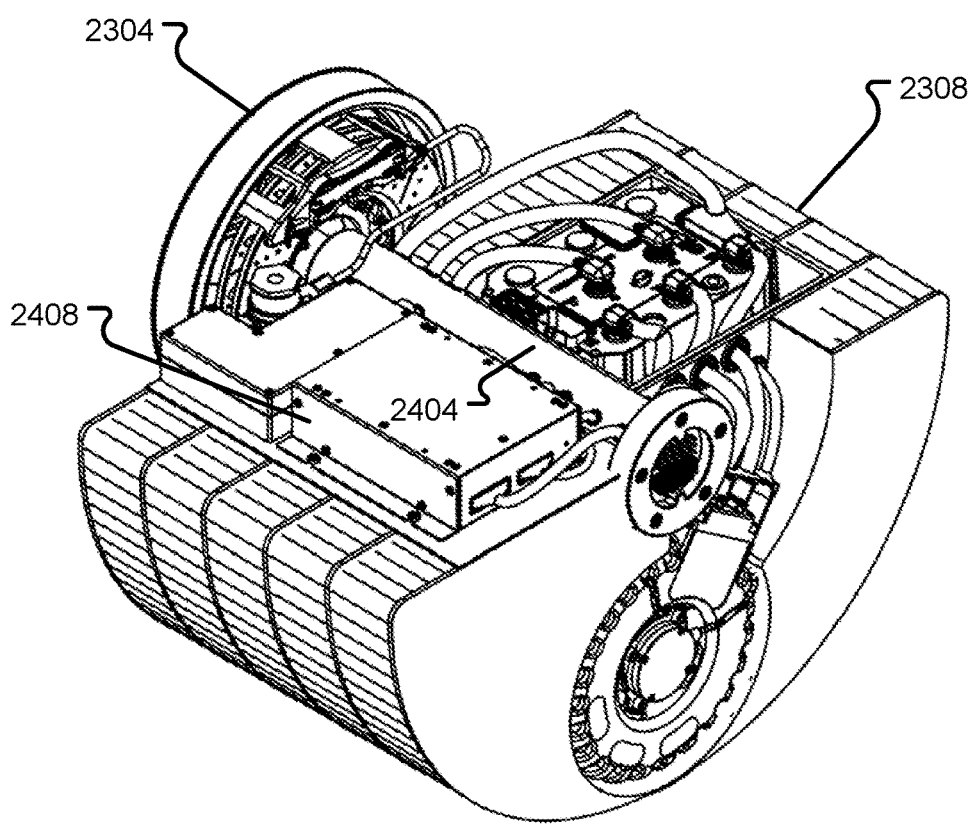
FIG. 24B is a different isometric view of the wheel core depicted in FIG. 24A.

While some wheel cores 2104 may be provided with a low center of gravity, it may also be possible to provide a wheel core 2104 like the wheel core depicted in FIGS. 22A and 22B which has a center of gravity substantially aligned with the axis of rotation of the wheel 108. Said another way, aspects of the present disclosure do not require, but may benefit from, having components of a wheel core 2104 provided below an axis of rotation of the wheel. It may also be desirable, but not required, to position the electrical interconnect 2004 at or near the axis of rotation of the wheel 108.

Figure 25A:
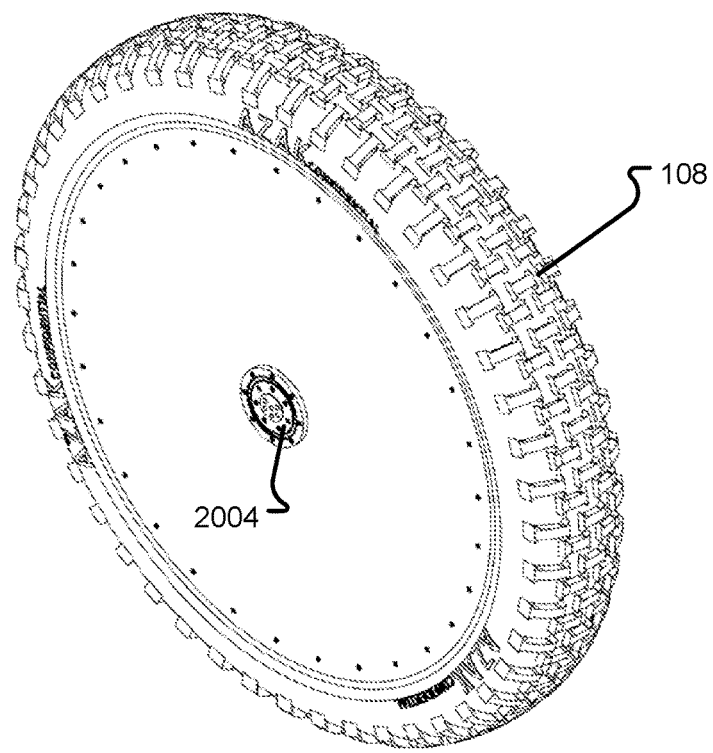
FIG. 25A illustrates another example of a wheel according to embodiments of the present disclosure.
Figure 25B:
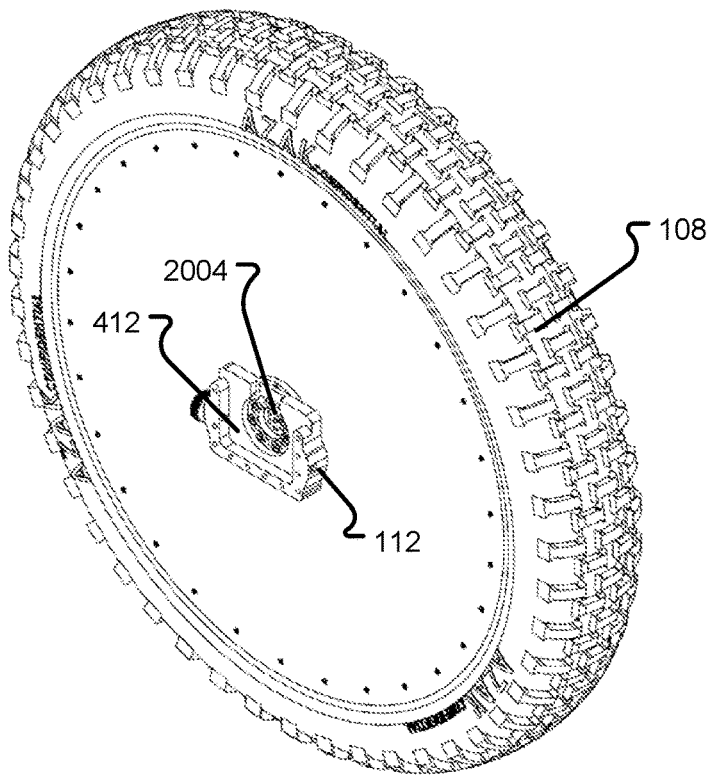
FIG. 25B illustrates the wheel of FIG. 25A with a coupling receiver mounted thereto.
Figure 25C:
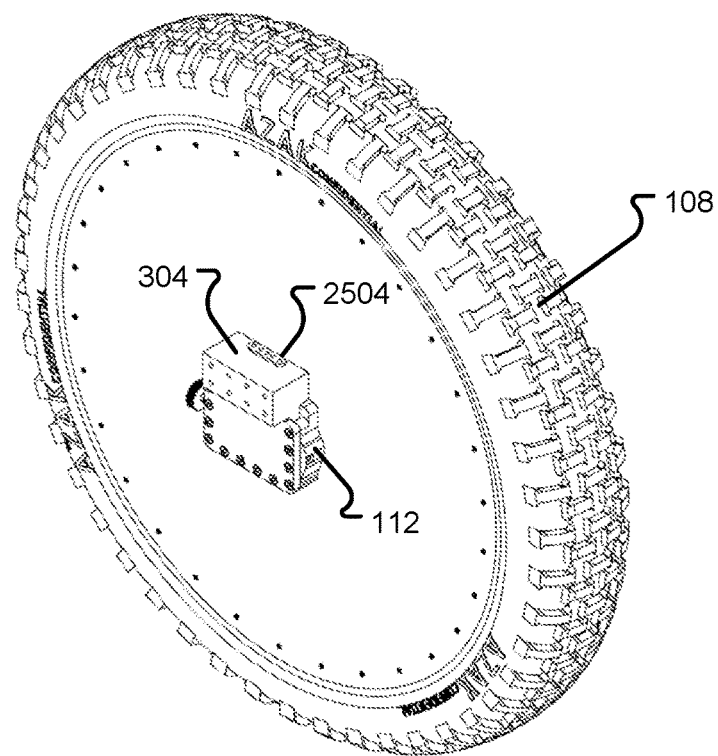
FIG. 25C illustrates the wheel of FIG. 25A with a coupling system in a coupled state.
Figure 25D:
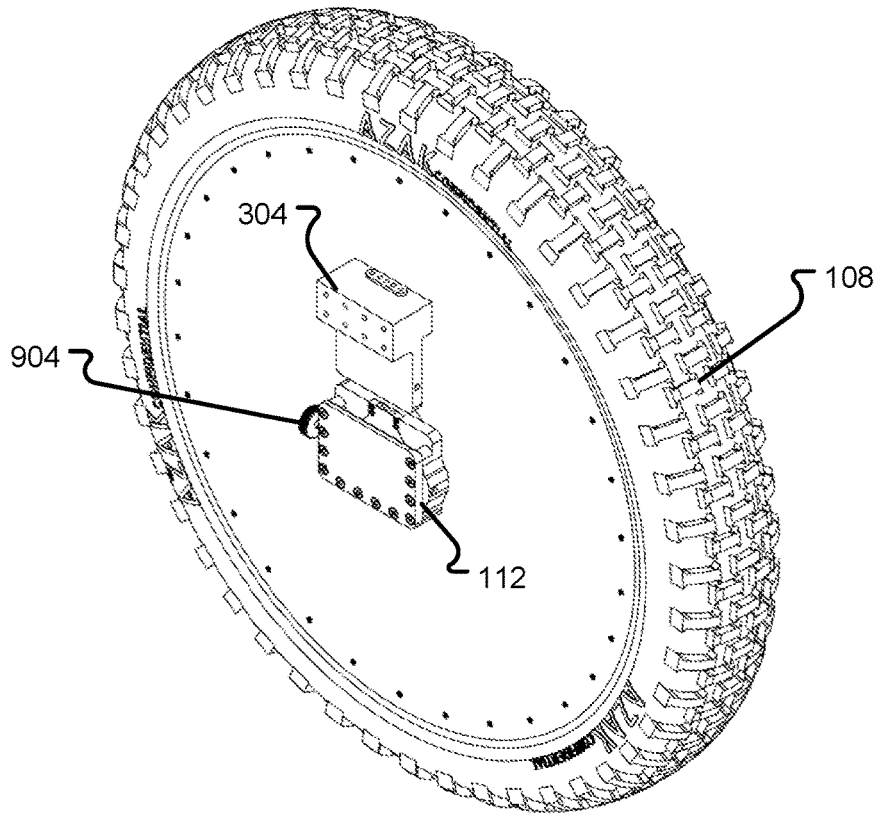
FIG. 25D illustrates the wheel of FIG. 25A with a coupling system in an uncoupled state.

FIGS. 25A-25D illustrate additional details of a wheel 108 having an electrical interconnect 2004 that is accessible, at least partially, via the coupling receiver 112. In particular, the coupling receiver 112 is shown to be mounted at least partially over top of the electrical interconnect 2004. FIG. 25C shows the coupling receiver 112 accepting the coupling 304 and the coupling system being in a coupled state. In some embodiments, the coupling 304 may include an access port 2504 that provides some amount of access or admittance to the electrical interconnect 2004 provided on the wheel 108. Alternatively or additionally, the coupling 304 may include connector pins or pin receptacles that interface directly with the electrical interconnect 2004. The coupling 304 may further be configured to provide a connection adapter function between a bus or cable on the vehicle frame 104 and the electrical interconnect 2004. Thus, the coupling 2004 may include physical components that support a weight of the vehicle frame 104 in addition to including one or more connection adapters, pins, pin receptacles, or the like.

FIGS. 26A-26D illustrate additional details of a wheel 108 having one or more internal component 2616 mounted within the wheel 108 with independent or additional suspension systems 2604. In the illustrated embodiment, an internal component 2616 of a wheel 108 may correspond to one, some, or all of the wheel 108 components depicted and described herein. Examples of internal components 2616 may include, without limitation, power sources, batteries, motors, motor controllers, heat distribution elements, fluid distribution elements, electrical components, mechanical components, etc. The wheel 108 is shown to have two suspension systems 2604 mounted within the cavity of the wheel 108. The suspension systems 2604 may be configured to store one or multiple different internal components 2616.

In some embodiments, the electrical interconnect 2004 may be mounted to a mounting plate 2624 or similar support designed to sit within the cavity of the wheel 108. The electrical interconnect 2004 may be fixedly mounted to the mounting plate 2624 (e.g., via welding, a quick coupler, or the like) such that forces imparted on the wheel 108 (e.g., via the ground or other objects that are being travelled over by the wheel 108) are substantially transferred to the mounting plate 2624. In other embodiment, it may be possible to decouple or absorb some of the forces imparted on the wheel through use of a mounting suspension system 2620, which couples the electrical interconnect 2004 to the mounting plate 2624.

Figure 26A:
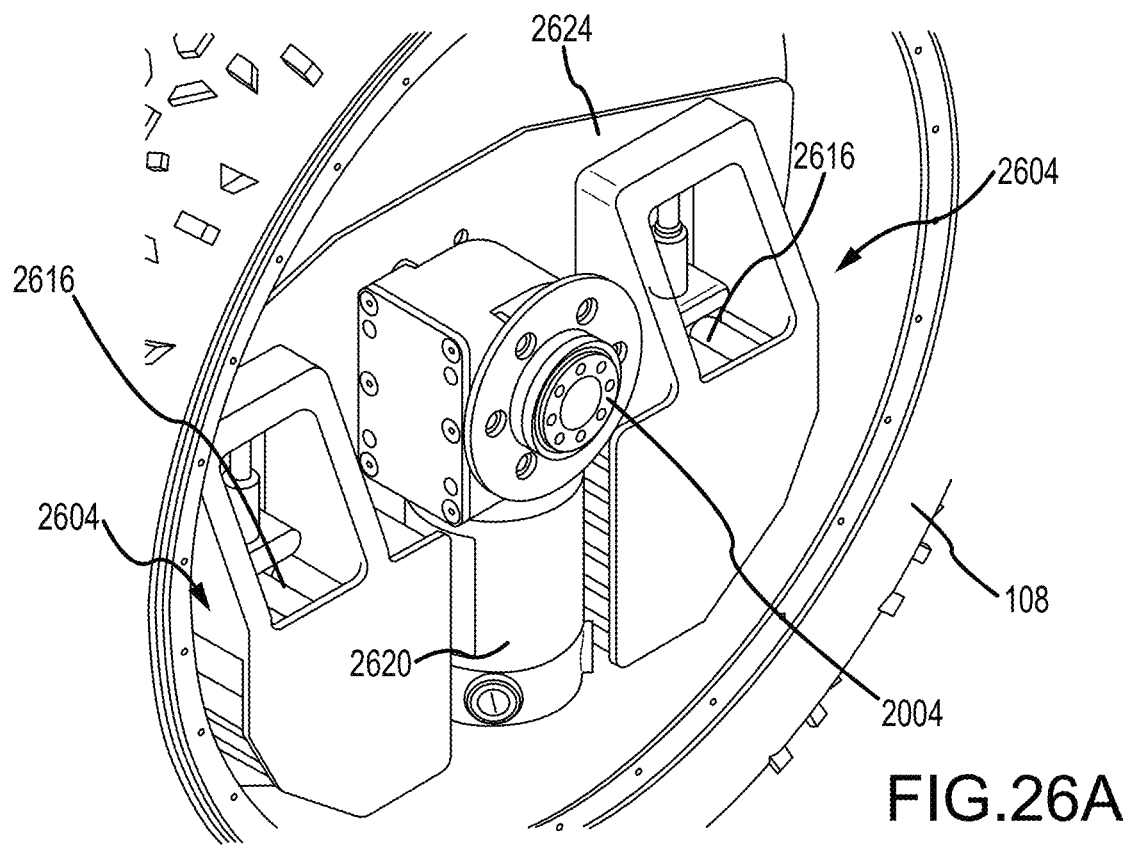
FIG. 26A illustrates another example of a wheel according to embodiments of the present disclosure.
Figure 26B:
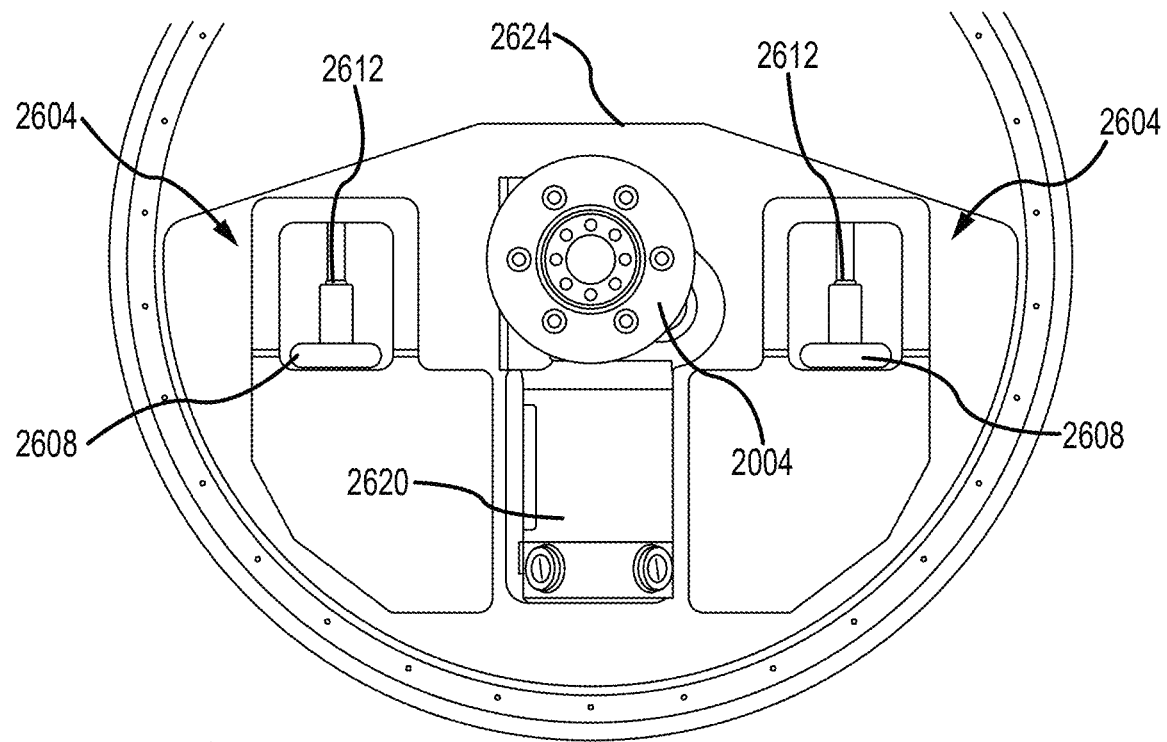
FIG. 26B illustrates the wheel of FIG. 26A in a first state.
Figure 26C:
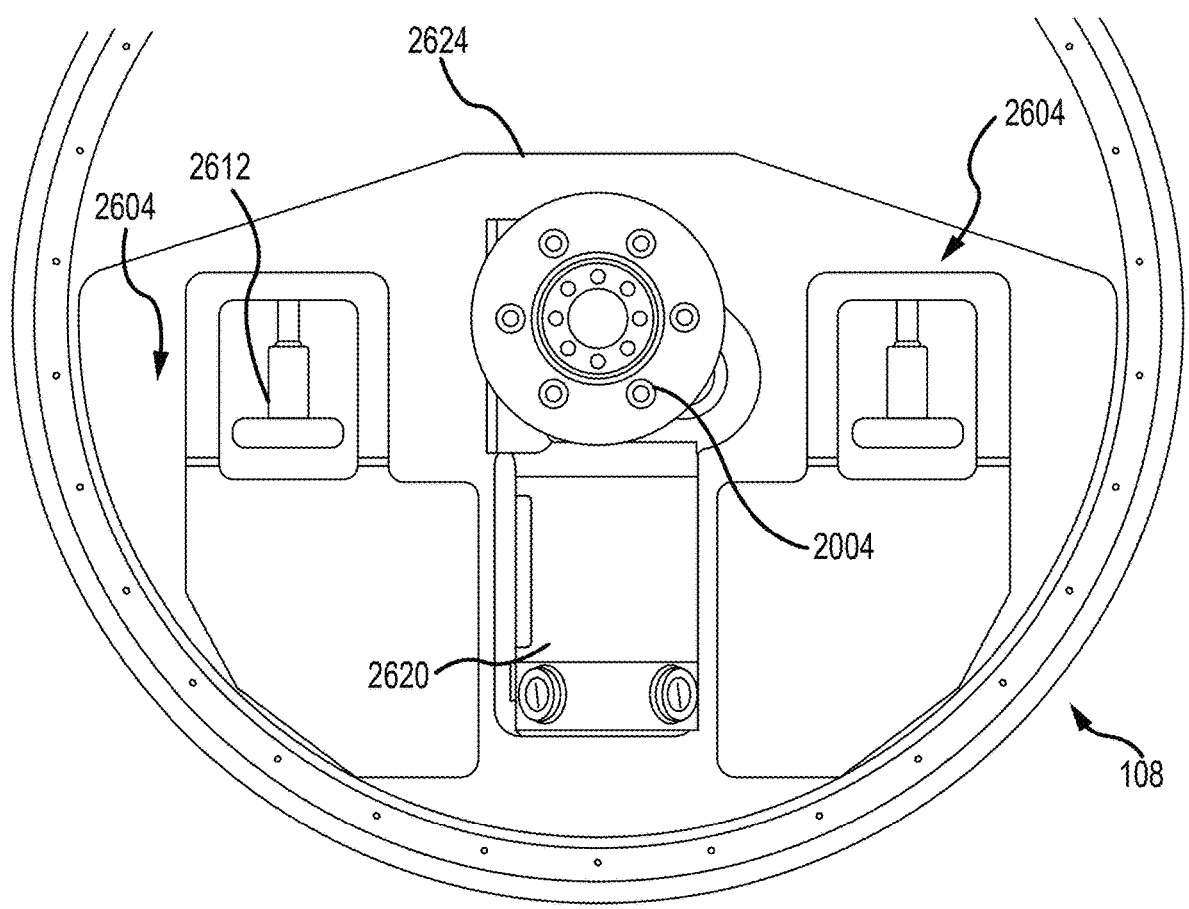
FIG. 26C illustrates the wheel of FIG. 26A in a second state.

FIGS. 26B and 26C illustrate the action/motion of the suspension systems 2604 where a force (e.g., upward compressive, downward compressive, etc.) imparted on the wheel 108 causes the suspension systems 2604 to move between a first state (e.g., compressed) and a second state (e.g., decompressed or less compressed than the first state).

The suspension systems 2604 are shown to be connected to the mounting plate 2624 by a combination of a shock 2612 and shock mount 2608. Although depicted as a shock 2612, it should be appreciated that the mechanism used to couple the suspension system 2604 to the mounting plate 2624 may include one or more of a spring, piston, hydraulic, pneumatic, or other type of force-dampening system.

By providing the suspension systems 2604, alone or in combination with the mounting suspension system 2620, it may be possible to minimize or reduce forces on the wheels 108 from transferring to and damaging internal components 2616 of the wheel 108. While many of the internal components 2616 are shown to be housed within the independent suspension systems 2604, it should be appreciated that one or more internal components 2616 may be fixedly mounted to the mounting plate 2624 without departing from the scope of the present disclosure.

Various vehicle configurations illustrate a two-wheel or four-wheel embodiment of the present disclosure. It should be appreciated that a vehicle may be configured to support any number of wheels (e.g., 1, 2, 3, 4, 5, . . . , 10, etc.) without departing from the scope of the present disclosure. Additionally, while certain examples of vehicles 100 have been shown with a particular combination of vehicle frame 104 and wheel(s) 108, it should be appreciated that any of the wheels 108 depicted and described herein may be used with any of the vehicle frames 104 without departing from the scope of the present disclosure.

Specific details were given in the description to provide a thorough understanding of the embodiments. However, it will be understood by one of ordinary skill in the art that the embodiments may be practiced without these specific details. Additionally, the Figures do not depict well-known features that may be needed to create a working vehicle so as not to obscure the embodiments in unnecessary detail.

What is claimed is:

1. A vehicle, comprising:
 a wheel configured to rotate around a wheel core, wherein the wheel core comprises a motor that imparts a rotational force on the wheel causing the wheel to rotate around the wheel core; and
 a coupling system that couples the wheel core to a vehicle frame, wherein the coupling system releasably attaches the wheel core to the vehicle frame such that in a coupled state the coupling system substantially prevents rotation of the wheel core relative to the vehicle frame, wherein the coupling system comprises an electrical interconnect that provides an electrical pathway between electrical components provided in the wheel core and electrical components supported by the vehicle frame, and wherein the coupling system comprises a plurality of electrical pins that carry an electrical signal between the electrical components provided in the wheel core and the electrical components supported by the vehicle frame.

2. The vehicle of claim 1, wherein the electrical components provided in the wheel core include the motor that imparts the rotational force on the wheel.

3. The vehicle of claim 2, wherein the electrical components provided in the wheel core further include a power supply for the motor.

4. The vehicle of claim 1, wherein the motor and the electrical components provided in the wheel core are positioned below an axis of rotation of the wheel.

5. The vehicle of claim 1, wherein the motor is positioned below an axis of rotation of the wheel.

6. The vehicle of claim 1, wherein the coupling system comprises an actuator that engages and disengages a mechanical lock that, when engaged, secures a coupling receiver to a coupling.

7. The vehicle of claim 6, further comprising a remote input and a control device, wherein the remote input provides a control signal to a control device, which causes the control device to manipulate the actuator, thereby causing the actuator to engage or disengage the mechanical lock, wherein the control signal is provided from the remote input via at least one of a wired and wireless connection.

8. The vehicle of claim 1, wherein the coupling system comprises a coupling and a coupling receiver that accepts and secures the coupling in the coupled state.

9. The vehicle of claim 8, wherein the coupling comprises a mating feature that mechanically locks the coupling to the coupling receiver in the coupled state.

10. The vehicle of claim 8, wherein the coupling is mounted to the wheel core and wherein the coupling receiver is mounted to the vehicle frame.

11. The vehicle of claim 8, wherein the coupling is mounted to the vehicle frame and wherein the coupling receiver is mounted to the wheel core.

12. The vehicle of claim 8, wherein the coupling comprises a frame-side face, a wheel-side face, a bottom end, a top end, and at least two side edges that extend from the frame-side face to the wheel-side face.

13. A vehicle, comprising:
 a wheel configured to rotate around a wheel core, wherein the wheel core comprises a motor that imparts a rotational force on the wheel causing the wheel to rotate around the wheel core; and
 a coupling system that couples the wheel core to a vehicle frame, wherein the coupling system comprises a coupling and a coupling receiver that accepts and secures the coupling in a coupled state, wherein the coupling system releasably attaches the wheel core to the vehicle frame such that in a coupled state the coupling system substantially prevents rotation of the wheel core relative to the vehicle frame wherein the coupling comprises a frame-side face, a wheel-side face, a bottom end, a top end, and at least two side edges that extend from the frame-side face to the wheel-side face and, wherein the coupling receiver comprises a receiver body and a receiver slot that accepts the coupling.

14. The vehicle of claim 13, wherein the receiver slot comprises an opening on one end that accepts the bottom end of the coupling.

15. The vehicle of claim 14, wherein the coupling is moved into and out of the receiver slot with a vertical translation of the vehicle frame relative to the wheel.

16. A wheel, comprising:
a wheel core including a motor that imparts a rotational force on the wheel causing the wheel to rotate around the wheel core;
a coupling mounted to the wheel core and configured to mate with a coupling receiver provided on a vehicle frame, wherein the coupling receiver and coupling, when in a coupled state, substantially prevent rotation of the wheel core relative to the vehicle frame;
a wheel cavity;
one or more internal components mounted within the wheel cavity; and
a suspension system that absorbs at least some forces imparted on the wheel from transferring to the one or more internal components, wherein the suspension system is mounted in the wheel cavity.

17. The wheel of claim 16, further comprising:
a mounting plate onto which the coupling is mounted, wherein the suspension system is mounted to the mounting plate.

18. The wheel of claim 17, wherein the coupling is mounted to the mounting plate by an additional suspension system.

19. The wheel of claim 16, wherein the suspension system comprises at least one of a spring, shock, hydraulic, and pneumatic.

20. A vehicle, comprising:
a wheel configured to rotate around a wheel core, wherein the wheel core comprises a motor that imparts a rotational force on the wheel causing the wheel to rotate around the wheel core;
a coupling system that couples the wheel core to an object, wherein the coupling system releasably attaches the wheel core to the object such that in a coupled state the coupling system substantially prevents rotation of the wheel core relative to the object, wherein the coupling system comprises an electrical interconnect that provides an electrical pathway between electrical components provided in the wheel core and electrical components supported by the object, wherein the electrical components provided in the wheel core include the motor that imparts the rotational force on the wheel, wherein the electrical components provided in the wheel core further include a power supply, and wherein the electrical interconnect comprises a plurality of electrical pins that carry an electrical signal between the electrical components provided in the wheel core and the electrical components supported by the object.

21. The vehicle of claim 20, further comprising a second wheel, wherein the second wheel is configured to rotate around a second wheel core, and wherein an axis of rotation of the wheel is offset from an axis of rotation of the second wheel.

22. A vehicle, comprising:
a wheel configured to rotate around a wheel core, wherein the wheel core comprises a motor that imparts a rotational force on the wheel causing the wheel to rotate around the wheel core;
at least a portion of a power supply that provides power to the motor; and
a coupling system that couples the wheel core to a vehicle frame or an object, wherein the coupling system releasably attaches the wheel core to the vehicle frame or the object such that in a coupled state the coupling system substantially prevents rotation of the wheel core relative to the vehicle frame or the object, and wherein the coupling system comprises a plurality of electrical pins that carry an electrical signal between electrical components provided in the wheel core and electrical components supported by the vehicle frame or the object.

23. The vehicle of claim 22, wherein the at least a portion of the power supply is provided in the wheel core.

24. The vehicle of claim 23, wherein the at least a portion of the power supply is positioned below an axis of rotation of the wheel.

25. The vehicle of claim 24, further comprising a second wheel configured to rotate around a second wheel core, wherein the axis of rotation of the wheel is offset from an axis of rotation of the second wheel.

26. The vehicle of claim 25, wherein the second wheel is rotated by a second motor that receives power from the power supply.

* * * * *